(12) United States Patent
Spadacini

(10) Patent No.: US 11,905,857 B2
(45) Date of Patent: Feb. 20, 2024

(54) PLANT AND PROCESS FOR ENERGY GENERATION AND STORAGE

(71) Applicant: ENERGY DOME S.P.A., Milan (IT)

(72) Inventor: Claudio Spadacini, Ghiffa (IT)

(73) Assignee: ENERGY DOME S.P.A., Milan (IT)

( * ) Notice: Subject to any disclaimer, the term of this patent is extended or adjusted under 35 U.S.C. 154(b) by 0 days.

(21) Appl. No.: 17/906,684

(22) PCT Filed: Mar. 23, 2021

(86) PCT No.: PCT/IB2021/052387
§ 371 (c)(1),
(2) Date: Sep. 19, 2022

(87) PCT Pub. No.: WO2021/191786
PCT Pub. Date: Sep. 30, 2021

(65) Prior Publication Data
US 2023/0175418 A1    Jun. 8, 2023

(30) Foreign Application Priority Data
Mar. 24, 2020  (IT) .................. 102020000006196

(51) Int. Cl.
*F01K 25/10* (2006.01)
*F01K 3/18* (2006.01)
*F02C 6/14* (2006.01)

(52) U.S. Cl.
CPC .............. *F01K 25/103* (2013.01); *F01K 3/18* (2013.01); *F02C 6/14* (2013.01); *Y02E 60/14* (2013.01)

(58) Field of Classification Search
CPC ...... F02C 6/14; F02C 6/16; F02C 1/10; F02C 1/105; Y02E 60/14; Y02E 60/16; F01K 25/103; F01K 3/00–267
See application file for complete search history.

(56) References Cited

U.S. PATENT DOCUMENTS

| | | |
|---|---|---|
| 2009/0282840 A1 | 11/2009 | Chen et al. |
| 2010/0251711 A1 | 10/2010 | Howes et al. |

(Continued)

FOREIGN PATENT DOCUMENTS

| | | |
|---|---|---|
| DE | 10 2018 001 279 A1 | 8/2019 |
| EP | 2 312 131 A2 | 4/2011 |

(Continued)

OTHER PUBLICATIONS

International Search Report & Written Opinion dated Sep. 13, 2021 in PCT/IB2021/052387, filed on Mar. 23, 2021, 13 pages.

*Primary Examiner* — Laert Dounis
(74) *Attorney, Agent, or Firm* — Oblon, McClelland, Maier & Neustadt, L.L.P.

(57) ABSTRACT

A plant for storing energy comprises a casing for the storage of a working fluid other than atmospheric air, in gaseous phase and in equilibrium of pressure with the atmosphere; a tank for the storage of said working fluid in liquid or supercritical phase with a temperature close to the critical temperature. The plant is configured to perform a closed cyclic thermodynamic transformation, first in one direction in a charge configuration and then in an opposite direction in a discharge configuration, between said casing and said tank. In the charge configuration the plant stores heat and pressure and in the discharge configuration the plant generates energy. The plant is also configured to define a closed circuit and to perform a closed thermodynamic cycle in the closed circuit with at least a part of the working fluid.

20 Claims, 10 Drawing Sheets

(56) References Cited

U.S. PATENT DOCUMENTS

2010/0257862 A1    10/2010  Howes et al.
2012/0216520 A1*   8/2012   Chen ................... F25J 3/04193
                                                       60/412
2016/0178129 A1    6/2016   Chen et al.

FOREIGN PATENT DOCUMENTS

| EP | 2 312 131 A3 | | 4/2011 | | |
| GB | 2484080 A | * | 4/2012 | ........... | F01K 25/103 |
| GB | 2537126 A | | 10/2016 | | |
| WO | WO-2018218617 A1 | * | 12/2018 | ................ | F02C 6/00 |
| WO | WO 2020/039416 A2 | | 2/2020 | | |
| WO | WO 2020/039416 A3 | | 2/2020 | | |

* cited by examiner

FIG.1
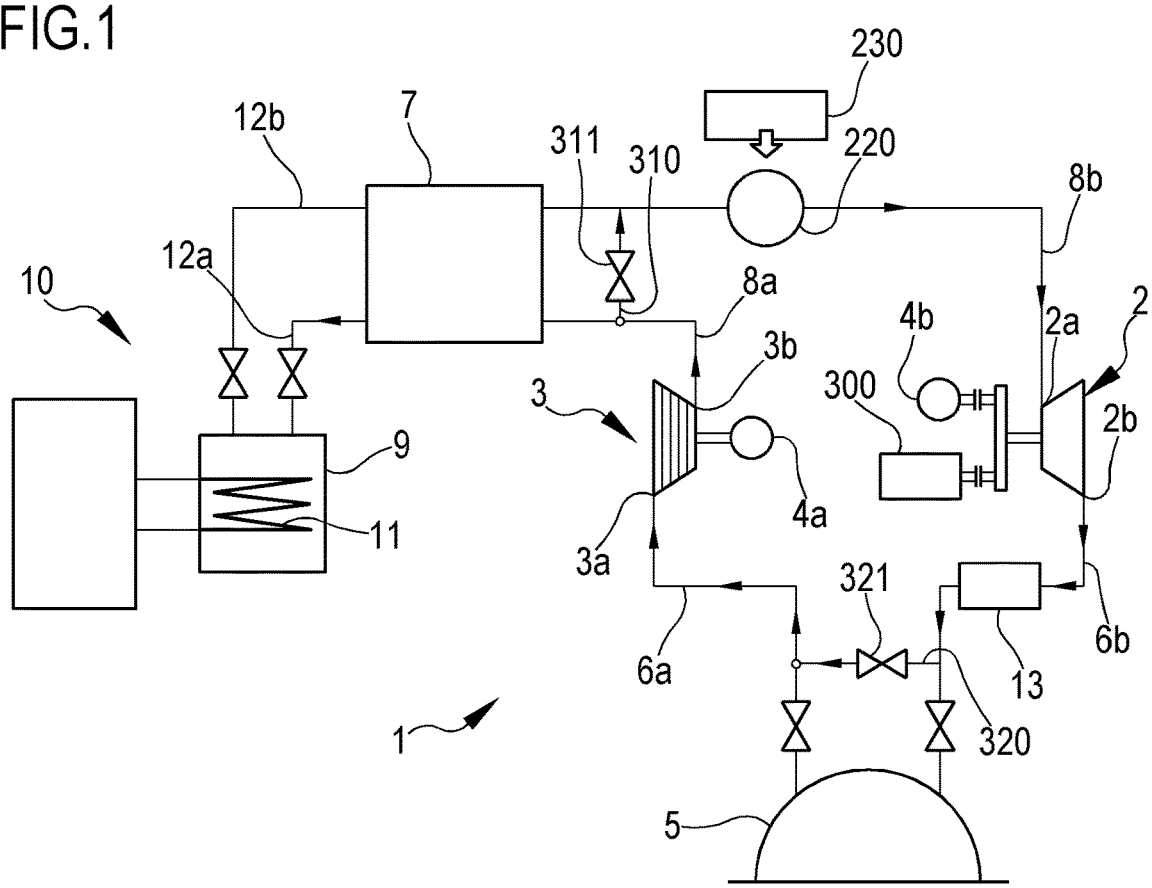
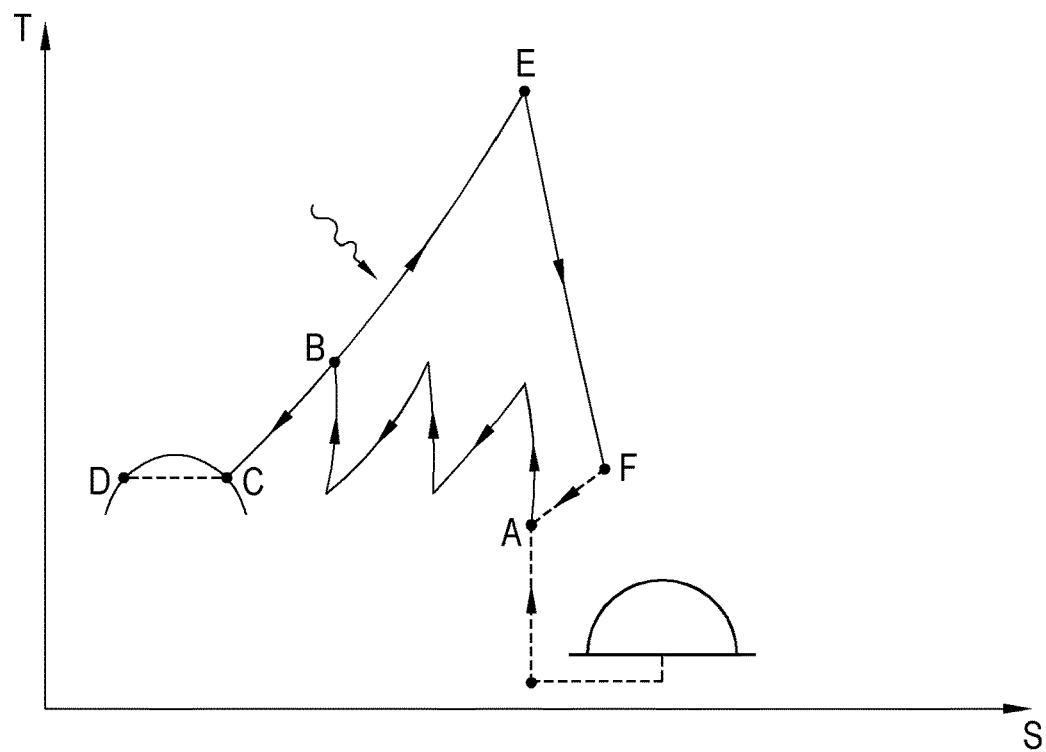
FIG.2

FIG.3
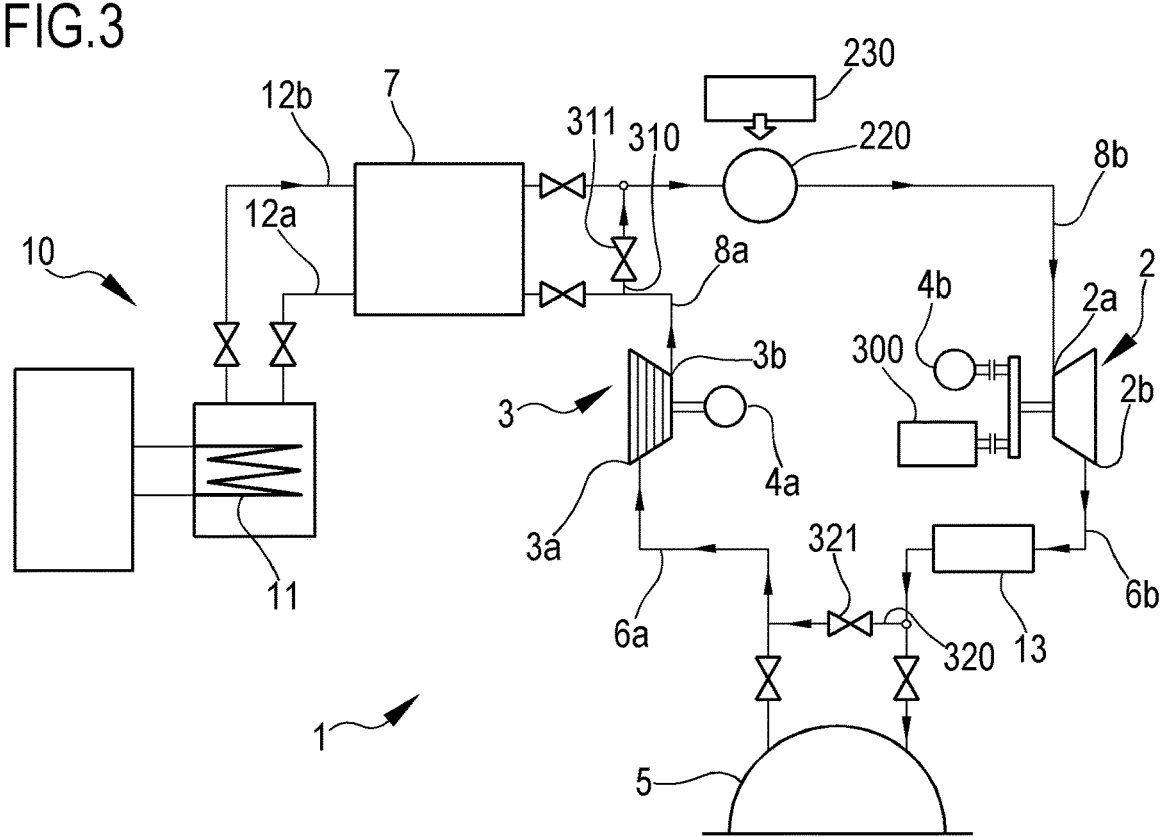
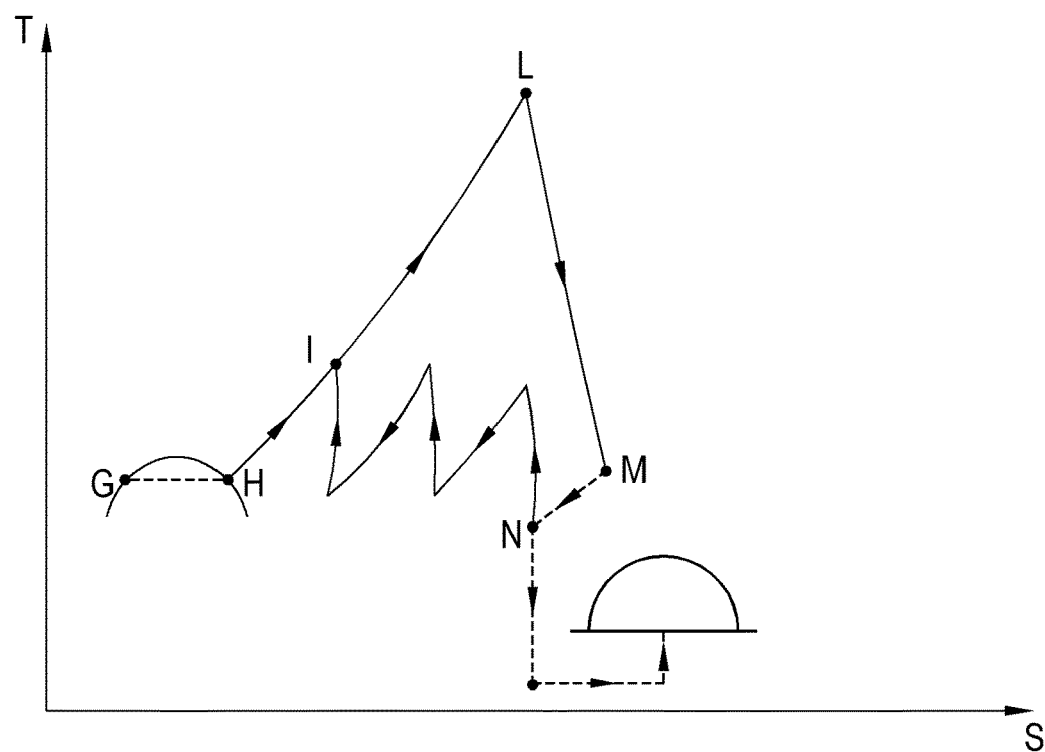
FIG.4

PLANT AND PROCESS FOR ENERGY GENERATION AND STORAGE

FIELD OF THE FINDING

The object of the present invention is a plant and a process for generating and storing energy.

More precisely, the object of the present invention is a system capable of absorbing/using energy, of maintaining over time the energy stored and capable of transforming it into mechanical energy for the actuation of one or more driven machines and/or capable of transforming it into electrical energy and re-introducing it onto the grid at times of request of said electrical energy, but also of generating electrical energy from an external energy source (for example: recovery heat/WHR, solar, hydrogen (H2), biomass, waste, fossil fuel).

More in detail, the present invention relates to a system of generation from various sources and of storage of electrical energy in the form of potential energy (pressure) and thermal/thermodynamic energy, through the actuation of a thermodynamic cycle and/or of a cyclic thermodynamic transformation.

The present invention is situated in the field of systems of generation from various sources and of storage of energy of medium and large scale, for both land and sea applications, typically with powers ranging from hundreds of kW to tens of MW (e.g. 20-25 MW), but also hundreds of MW, and with storage capacities ranging from a few hundred kWh to hundreds of MWh and even up to several GWh.

The present invention can also be situated in the field of systems of generation from various sources and of energy storage of small scale, for home and commercial applications, both land and sea, typically with powers ranging from a few kW to several hundred kW and with storage capacity from a few kWh up to hundreds of kWh.

Definitions

In the present description and in the enclosed claims, reference will be made to the following definitions.
  Thermodynamic cycle (TC): thermodynamic transformation from a point X to a point Y, where X coincides with Y; the TC unlike the CTT (Cyclic thermodynamic transformation) mentioned below does not have mass accumulations (significant for energy purposes) within the cycle, while the CTT typically works between two working fluid storages, one initial and the other final;
  Cyclic thermodynamic transformation (CTT): thermodynamic transformation from a point X to a point Y and from a point Y to a point X, without necessarily passing from the same intermediate points;
  Closed TC and/or CTT: with mass exchange (significant for energy purposes) with the atmosphere;
  Open TC and/or CTT: with mass exchange (significant for energy purposes) with the atmosphere.

BACKGROUND OF THE FINDING

Recently, due to the increasing diffusion of systems of energy production from renewable sources and in particular from wind and photovoltaic sources, which are characterized by production variability and unpredictability, electrical energy storage systems have been taking on increasing importance.

Together with the abovementioned need, there is also an increasing need for systems for energy generation and recovery from non-conventional and non-programmable sources in the absence of "energy storage", such as for example from a thermodynamic solar source.

The public document WO/2020/039416, in the name of the same Applicant, illustrates an energy storage plant and process. The plant comprises a casing for the storage of a working fluid other than atmospheric air, in gaseous phase and in equilibrium of pressure with the atmosphere; a tank for the storage of such working fluid in liquid or supercritical phase with a temperature close to the critical temperature, in which said critical temperature is close to the ambient temperature. The plant is configured to perform a closed cyclic thermodynamic transformation, first in one direction in a charge configuration and then in an opposite direction in a discharge configuration, between the casing and the tank.

In the charge configuration the plant stores heat and pressure and in the discharge configuration the plant generates energy.

SUMMARY

The Applicant has observed that the process and the plant described in WO/2020/039416 can be further improved, in particular with reference to the flexibility of the same.

The Applicant has also observed that the process can be improved up to integrating and constituting a system for generating mechanical/electrical energy from non-programmable sources and from other sources.

The Applicant has in particular felt the need to make systems for generating mechanical/electrical power that are capable of adjusting the absorbed and generated energy, in particular the electrical energy which is exchanged with the power grid in a manner not proportional with the energy input, thus attaining a prime mover (or vice versa a heat pump) capable of delivering a power not proportional with the energy input or better yet proportional to such input but offset over time.

In such context, the Applicant has set the objective of ideating and attaining a plant and a process for the energy generation and storage which allows: temporally freeing the mechanical/electrical output from the energy input and/or adjusting the grid frequency (both ultra-rapid and primary adjustment); carrying out fast ramping operations, balancing operations, etc.

The Applicant has found that the above-indicated objectives and still others can be reached by means of an energy storage system operating by means of cyclic thermodynamic transformations (CTT) of a working fluid, like that illustrated in WO/2020/039416, combined with a closed thermodynamic cycle (TC) made with at least a part of the same working fluid.

The Energy Storage (CTT) system operates first in one direction and then in the opposite direction, between the storages of the working fluid in two separate tanks, of which one (that at lower temperature) atmospheric, but which is not constituted by atmospheric air but by another gas in equilibrium of pressure with the atmosphere. Said system is also characterized in that it stores the energy, transforming the working fluid from an initial gaseous/vapor state to a final liquid or super-critical state with temperature close to the critical temperature (e.g. less than 1.2 times the Critical temperature in Kelvin, preferably between 0.5 and 1.2 times). It is also characterized in that said critical temperature is preferably not far from the ambient temperature, preferably close to the ambient temperature (preferably between 0° C. and 200° C., more preferably between 0° and 100° C.).

The closed thermodynamic cycle (TC) can be sub-critical, super-critical or trans-critical and is actuated with the same machines of the Energy Storage (CTT) system, which work as prime mover (or as heat pump). Overall, the system is therefore hybrid and works both as battery (Energy Storage CTT) and as prime mover/heat pump (TC).

The working fluid is preferably carbon dioxide ($CO_2$), but in order to improve the performances of the system, also in relation to the particular environmental conditions where one operates, a mixture could be used of $CO_2$ and other substances so as to correct the critical temperature $T_c$ of the fluid. Other fluids, such as $SF_6$, $N_2O$, etc., can be used, always pure or mixed with others. In the proposed system, there is a storage of heat recovered from the delivery of a compressor. Tanks, both at high and low pressure, work at constant pressures or at pressures that are in any case adjusted within certain well-defined ranges, both when the system operates in subcritical and supercritical conditions, possibly with different adjustment strategies.

In particular, the above-indicated objectives and still others are substantially achieved by a plant and by a process for energy generation and storage of the type claimed in the enclosed claims and/or described in the following aspects.

In an independent aspect, the present invention regards an energy generation and storage plant.

Preferably, the plant comprises: a working fluid other than atmospheric air; a casing configured to store the working fluid in gaseous phase and in equilibrium of pressure with the atmosphere; a tank configured to store said working fluid in liquid or supercritical phase with a temperature close to the critical temperature.

Preferably, said critical temperature is close to the ambient temperature, preferably between 0° C. and 100° C.

Preferably, the plant is configured to perform a closed cyclic thermodynamic transformation (CTT), first in one direction in a charge configuration and then in an opposite direction in a discharge configuration, between said casing and said tank; in which in the charge configuration the plant stores heat and pressure and in the discharge configuration the plant generates energy.

Preferably, the plant is also configured to define/delimit a closed circuit and to perform a closed thermodynamic cycle (TC) in said closed circuit with at least a part of said working fluid.

Preferably, the plant is also configured to perform the closed thermodynamic cycle (TC) while said plant is in the charge configuration or in the discharge configuration.

In an independent aspect, the present invention regards a process for energy generation and storage.

Optionally such process is performed with the plant according to the preceding aspect and/or according to at least one of the following aspects.

Preferably, the process comprises: performing a closed cyclic thermodynamic transformation (CTT), first in one direction in a charge configuration/phase and then in an opposite direction in a discharge configuration/phase, between a casing for the storage of a working fluid other than atmospheric air, in gaseous phase and in equilibrium of pressure with the atmosphere, and a tank for the storage of said working fluid in liquid or supercritical phase with a temperature close to the critical temperature. In the charge phase the process accumulates heat and pressure and in the discharge phase the process generates energy.

Preferably, said critical temperature is close to the ambient temperature, preferably between 0° C. and 100° C.

Preferably, the process comprises: performing, with at least a part of said working fluid, a closed thermodynamic cycle (TC).

Preferably, the closed thermodynamic cycle (TC) is a Brayton cycle.

Preferably, the closed thermodynamic cycle (TC) is actuated simultaneously with the charge phase or with the discharge phase.

In one aspect, the closed thermodynamic cycle (TC) operates without accumulation and without release, i.e. with net flow of working fluid from and towards the storages (tank and casing) at high and low pressure that is negligible or zero.

In one aspect, the closed thermodynamic cycle (TC) is that of a prime mover and produces electrical and/or mechanical energy, optionally without accumulation or discharge of additional energy.

In a different aspect, the closed thermodynamic cycle (TC) is that of a heat pump and generates and releases heat, optionally without accumulation or discharge of additional energy.

The Applicant has verified that the plant and the process according to the invention allow obtaining the pre-established objectives.

In particular, the Applicant has verified that the invention allows managing the absorbed and stored energy, returned and generated in a flexible and effective manner.

For example, the invention allows adjusting the grid frequency; carrying out the operations of fast ramping, Fast Reserve Unit or Fast Control Reserve, primary reserve, balancing, etc.

For example, assuming that a certain quantity of working fluid is accumulated in the tank 9 and assuming a closed thermodynamic cycle (TC) with 25% efficiency with additional thermal energy (given by the further heat exchanger which receives heat from the additional heat source) of 20 MW thermal, signifies that the net electrical energy of the cycle is equal to 5 MWe (result of a 13 MWe turbine and an 8 MWe compressor, the latter being subtracted from those generated by the turbine). In case of need, it will be possible to turn off or in any case place in minimum absorption conditions the compressor 3 and hence give the Fast Reserve Unit 13 MW service by exploiting the working fluid stored in the tank 9.

The Applicant has also verified that the invention allows operating the storage of energy in places without particular geo-morphological characteristics, also for sea/off-shore applications, in a safe manner and with a low environmental impact.

The Applicant has also verified that the invention allows obtaining high RTEs.

Aspects of the invention are listed hereinbelow.

In one aspect, the working fluid has a critical temperature comprised between 0° C. and 200° C.

In one aspect, the working fluid has a density at 25° C. comprised between 0.5 kg/m³ and 10 kg/m³.

In one aspect, the working fluid is chosen in the group comprising: $CO_2$, $SF_6$, $N_2O$.

In one aspect, the plant comprises a compressor and a motor mechanically connected to each other.

In one aspect, the plant comprises a turbine and an electric generator and/or a driven machine (different from an electric generator) mechanically connected to each other.

In one aspect, the motor and the generator are a single motor generator.

In one aspect, connection devices, for example of friction type, interposed between the motor generator and the turbine and between the motor generator and the compressor are configured for connecting and disconnecting, upon command, the turbine and/or the compressor to/from the motor generator.

In one aspect, the plant comprises said casing externally in contact with the atmosphere and delimiting, at its interior, a volume configured to contain the working fluid at atmospheric pressure or substantially atmospheric pressure, in which said volume is selectively in fluid communication with an inlet of the compressor or with an outlet of the turbine.

In one aspect, a primary heat exchanger is selectively in fluid communication with an outlet of the compressor or with an inlet of the turbine.

In one aspect, the plant comprises said tank in fluid communication with the primary heat exchanger to accumulate the working fluid.

In one aspect, a secondary heat exchanger is operatively active between the primary heat exchanger and the tank or is operatively active in said tank.

In one aspect, an additional heat exchanger is operatively interposed between the casing and the compressor and/or between the casing and the turbine.

In one aspect, a further heat exchanger is operatively interposed between the turbine and the primary heat exchanger.

In one aspect, the further heat exchanger is operatively associated with an additional heat source.

In one aspect, if the closed thermodynamic cycle (TC) is that of a prime mover, the additional heat source provides heat through the further heat exchanger to the working fluid.

In one aspect, the further heat exchanger is operatively associated with a heat user.

In one aspect, if the closed thermodynamic cycle (TC) is that of a heat pump, the further exchanger of heat to the working fluid transfers heat to the heat user.

In one aspect, the plant is configured to operate in the charge configuration or in the discharge configuration.

In one aspect, the plant is configured to define the closed circuit and to perform the closed thermodynamic cycle (TC).

In one aspect, in the charge configuration, the casing is in fluid communication with the inlet of the compressor and the primary heat exchanger is in fluid communication with the outlet of the compressor.

In one aspect, in the charge configuration, the turbine is at rest or it is active in order to execute the closed thermodynamic cycle (TC).

In one aspect, in the charge configuration, the turbine is fluxed with a minimum of fluid.

In one aspect, in the charge configuration, the motor is operating and drives the compressor to compress the working fluid coming from the casing.

In one aspect, in the charge configuration, the primary heat exchanger works as a cooler to remove heat from the compressed working fluid, cool it and store thermal energy.

In one aspect, in the charge configuration, the secondary heat exchanger works as a cooler to remove further heat from the compressed working fluid and store further thermal energy.

In one aspect, in the charge configuration, the tank receives and stores the compressed and cooled working fluid, in which the working fluid stored in the tank has a temperature close to a critical temperature thereof.

In one aspect, in the discharge configuration, the casing is in fluid communication with the outlet of the turbine and the primary heat exchanger is in fluid communication with the inlet of the turbine.

In one aspect, in the discharge configuration, the compressor is at rest or it is active in order to execute the closed thermodynamic cycle (TC).

In one aspect, in the discharge configuration, the compressor is in rotation (connected to the motor/generator) but in a fluid recirculation configuration such to reabsorb the minimum energy.

In one aspect, in the discharge configuration and/or in the charge configuration and/or during the execution of the closed thermodynamic cycle (TC), all the rotary machines (turbines, compressors, motors, generators, motor-generators) are rotating.

In one aspect, the rotary machines in rotation are all synchronized with the grid.

The Applicant has verified that providing for the machines (turbine/turbines and/or compressor/compressors) to be rotating as well, independent of the closed thermodynamic cycle (TC), allows very quickly passing from the charge phase to that of discharging, in even less than 1 second and additionally the fact that the machines are connected to the grid allows providing grid inertia, allowing the sale of ultra-rapid adjustment services.

In one aspect, in the discharge configuration, the secondary heat exchanger works as a heater to release heat to the working fluid coming from the tank.

In one aspect, in the discharge configuration, the primary heat exchanger works as a heater to release further heat to the working fluid and heat it.

In one aspect, in the discharge configuration, the turbine is rotated by the heated working fluid and drives the generator and/or the driven machine, generating energy.

In one aspect, in the discharge configuration, the working fluid returns into the casing at atmospheric pressure or substantially atmospheric pressure.

In one aspect, the closed circuit comprises or passes through: the compressor, the further heat exchanger, the turbine and the additional heat exchanger.

In one aspect, in said closed circuit, the outlet of the compressor is in fluid communication with the further heat exchanger, the outlet of the turbine is in fluid connection with the inlet of the compressor and said additional heat exchanger is operatively interposed between the outlet of the turbine and the inlet of the compressor.

In one aspect, the charge phase comprises: compressing in a compressor said working fluid, coming from said casing externally in contact with the atmosphere and delimiting, at its interior, a volume configured to contain the working fluid at atmospheric pressure or substantially atmospheric pressure, absorbing energy.

In one aspect, the charge phase comprises: introducing the compressed working fluid through a primary heat exchanger and a secondary heat exchanger placed in series to bring a temperature of the working fluid close to a critical temperature thereof; in which the primary heat exchanger works as a cooler to remove heat from the compressed working fluid, cool it and store thermal energy, in which the secondary heat exchanger works as a cooler to remove further heat from the compressed working fluid and store further thermal energy.

In one aspect, the charge phase comprises: storing the cooled working fluid in said tank; in which the secondary heat exchanger and the primary heat exchanger carry out a super-critical transformation of the working fluid in a manner such that said working fluid is accumulated in the tank in supercritical phase or in which the secondary heat exchanger and the primary heat exchanger carry out a sub-critical transformation of the working fluid in a manner such that said working fluid is accumulated in the tank in liquid phase.

In one aspect, a temperature of the working fluid stored in the tank is comprised between 0° C. and 100° C.

In one aspect, a pressure of the working fluid stored in the tank is comprised between 10 bar and 150 bar.

In one aspect, the discharge phase comprises: passing the working fluid, coming from the tank, through the secondary heat exchanger and the primary heat exchanger; in which the secondary heat exchanger works as a heater to release heat to the working fluid coming from the tank, in which the primary heat exchanger works as a heater to release further heat to the working fluid and heat it.

In one aspect, the discharge phase comprises: passing the heated working fluid through a turbine, in which the turbine is rotated by the heated working fluid and drives a generator and/or a driven machine, generating energy, in which the working fluid expands and cools in the turbine.

In one aspect, the discharge phase comprises: re-introducing the working fluid coming from the turbine in the casing at atmospheric pressure or substantially atmospheric pressure.

In one aspect, the closed thermodynamic cycle (TC) comprises: compressing at least a part of said working fluid in the compressor.

In one aspect, the closed thermodynamic cycle (TC) comprises: passing said at least a part of said working fluid through a further heat exchanger operatively associated with an additional heat source and further heating said at least a part of said working fluid.

In one aspect, the closed thermodynamic cycle (TC) comprises: expanding said at least a part of said working fluid heated through a turbine, in which the turbine is rotated by the heated working fluid and drives a generator and/or a driven machine, generating energy, in which the working fluid expands and cools in the turbine.

In one aspect, the closed thermodynamic cycle (TC) comprises: cooling said at least a part of said working fluid in an additional heat exchanger and reintroducing said at least a part of said working fluid in the compressor.

In one aspect, the part of the working fluid which operates according to the closed thermodynamic cycle (TC) is comprised between 0% and 100% of said working fluid.

In one aspect, the part of the working fluid which operates according to the closed thermodynamic cycle (TC) is comprised between 20% and 30% of said working fluid.

In one aspect, the remaining part of the working fluid accumulated in the tank or in the casing is comprised between 100% and 0% of said working fluid.

In one aspect, the remaining part of the working fluid accumulated in the tank or in the casing is comprised between 80% and 70% of said working fluid.

In one aspect, a first bypass conduit is provided for.

In one aspect, the first bypass conduit comprises a respective first valve.

In one aspect, the first bypass conduit is configured to connect the outlet of the compressor with the further heat exchanger and bypassing the first heat exchanger and the tank.

In one aspect, a second bypass conduit is provided.

In one aspect, the second bypass conduit comprises a respective second valve.

In one aspect, the second bypass conduit is configured to connect the outlet of the turbine with the inlet of the compressor and bypassing the casing.

In one aspect, delivery pipes are provided, extended from the casing to the tank and return pipes extended from the tank to the casing.

In one aspect, the first bypass conduit connects the delivery pipes with the return pipes near the first heat exchanger.

In one aspect, the second bypass conduit connects the delivery pipes with the return pipes near the casing.

In one aspect, the first valve and the second valve can be throttled to adjust a flow of working fluid in the closed thermodynamic cycle (TC).

In one aspect, the primary heat exchanger is, or is operatively associated with, a thermal storage (Thermal Energy Storage—TES).

In one aspect, the delivery pipes comprise a first section which is extended between the casing and the inlet of the compressor.

In one aspect, the delivery pipes comprise a second section which is extended between the outlet of the compressor and the primary heat exchanger.

In one aspect, the delivery pipes comprise a third section which is extended between the primary heat exchanger and the secondary heat exchanger.

In one aspect, the return pipes comprise a first section which is extended between the secondary heat exchanger and the primary heat exchanger.

In one aspect, the return pipes comprise a second section which is extended between the primary heat exchanger and the inlet of the turbine.

In one aspect, the return pipes comprise a third section which is extended between the outlet of the turbine and the casing.

In one aspect, the second section of the delivery pipes and the second section of the return pipes are connected to each other and to the single pipe on one side of the primary exchanger.

The third section of the delivery pipes and the first section of the return pipes are connected to each other and to the single pipe on one side of the primary exchanger.

In one aspect, through the primary heat exchanger passes said single pipe or plurality of pipes which carries/carry out both the function of delivery, when the plant is in the charge configuration/phase, and of return, when the plant is in the discharge configuration/phase.

In one aspect, at least one valve is operatively situated on the first section of the delivery pipes and/or on the third section of the return pipes, in order to alternately place in fluid communication the casing with the compressor or the turbine with the casing.

In one aspect, at least one valve is operatively situated on the second section or on the third section of the delivery pipes and/or on the second section or on the first section of the return pipes, in order to alternately place in fluid communication the compressor with the primary heat exchanger and with the tank or the primary heat exchanger and the tank with the turbine.

In one aspect, the additional heat exchanger is operatively coupled to the first section of the delivery pipes and/or to the third section of the return pipes.

In one aspect, the further heat exchanger is operatively coupled to the second section of the return pipes.

In one aspect, the closed thermodynamic cycle (TC) is recuperative.

In one aspect, a recuperator is operatively active between the primary heat exchanger and the further heat exchanger and between the outlet of the turbine and the additional heat exchanger.

In one aspect, the recuperator is operatively coupled to the second and to the third section of the return pipes.

In one aspect, the additional heat source is: a solar source (e.g. solar field) and/or industrial recovery residual heat (Waste Heat Recovery) and/or gas turbine exhaust heat (GT) and/or heat coming from a fuel boiler.

In one aspect, the additional heat source is a topping thermodynamic cycle. In other words, the closed thermodynamic cycle (TC) is a bottoming thermodynamic cycle of a combined system/cycle (topping+bottoming).

In one aspect, the turbine is multi-stage and inter-heated.

In one aspect, the expansion is inter-heated.

In one aspect, the further heat exchanger is in fluid connection with at least one stage of the turbine in order to inter-heat said turbine.

In one aspect, an inter-heating circuit connects the turbine with the further heat exchanger.

In one aspect, the further heat exchanger provides for inter-heating the turbine.

In one aspect, the inter-heating is executed at about half expansion.

In one aspect, the compressor is multi-stage and inter-cooled.

In one aspect, provision is made for carrying out a plurality of inter-coolings in the charge phase and/or in the closed thermodynamic cycle (TC).

In one aspect, the primary heat exchanger is or comprises a heat regenerator with fixed or movable bed.

In one aspect, the casing is deformable.

In one aspect, the casing has the structure of a gasometer.

In one aspect, the casing is a pressure-balloon.

In one aspect, the casing is made of flexible material, preferably plastic, e.g. made of PVC coated polyester fabric.

In one aspect, the compression of the working fluid in the compressor is inter-cooled.

In one aspect, the tank is spherical or substantially spherical.

In one aspect, the tank is cylindrical or substantially cylindrical.

In one aspect, an external wall of the tank is made of metal.

In one aspect, a temperature of the working fluid stored in the tank is comprised between 0° C. and 100° C.

In one aspect, a pressure of the working fluid stored in the tank is comprised between 10 bar and 150 bar, preferably between 10 bar and 150 bar, preferably between 50 and 100 bar, preferably between 60 and 85 bar.

In one aspect, a ratio between a density of the working fluid when contained in the tank and a density of the same working fluid when contained in the casing is comprised between 200 and 500.

In one aspect, the secondary heat exchanger and the primary heat exchanger are configured for operating a super-critical transformation of the working fluid in a manner such that said working fluid is accumulated in the tank in supercritical phase.

In one aspect, provision is made for removing heat from the working fluid in the primary exchanger up to bringing it, in a T-S diagram, to a temperature higher than the critical temperature and above the Andrews curve.

In one aspect, provision is made for removing heat from the working fluid in the secondary heat exchanger, bringing it into supercritical phase and making it follow the right part of the Andrews curve.

In one aspect, the secondary heat exchanger and the primary heat exchanger are configured for operating a sub-critical transformation of the working fluid in a manner such that said working fluid is accumulated in the tank in liquid phase.

In one aspect, provision is made for removing heat from the working fluid in the primary exchanger up to bringing it, in a T-S diagram, to a temperature lower than the critical temperature and at a point of the left part of the Andrews curve.

In one aspect, provision is made for removing heat from the working fluid in the secondary heat exchanger by making it traverse the saturated vapor zone and up to bringing it into liquid phase.

In one aspect, the closed thermodynamic cycle (TC) has a higher pressure, in which said higher pressure is lower than a maximum pressure of the cyclic thermodynamic transformation (CTT) in the charge configuration/phase.

In one aspect, the closed thermodynamic cycle (TC) has a lower pressure, in which said lower pressure is higher than a minimum pressure of the cyclic thermodynamic transformation (CTT) in the discharge configuration/phase.

In one aspect, the lower pressure of the closed thermodynamic cycle (TC) is higher than the atmospheric pressure.

In other words, the closed thermodynamic cycle (TC) has two pressures, one higher and one lower, which can coincide or they can be respectively different from those at the start and end of the cyclic thermodynamic transformation (CTT).

In one aspect, provision is made for a primary additional heat exchanger situated between the primary heat exchanger and the secondary heat exchanger.

In one aspect, provision is made for an additional compressor situated between the primary heat exchanger and the secondary heat exchanger.

In one aspect, provision is made for an additional turbine situated between the primary heat exchanger and the secondary heat exchanger.

In one aspect, in the charge configuration/phase, the primary heat exchanger is in fluid communication with an inlet of the additional compressor while an outlet of the additional compressor is in fluid communication with the primary additional heat exchanger.

In one aspect, in the discharge configuration/phase, the primary additional heat exchanger is in fluid communication with an inlet of the additional turbine while an outlet of the additional turbine is in fluid communication with the primary heat exchanger.

In one aspect, in the charge configuration/phase, provision is made for compressing said working fluid in the compressor and in the additional compressor.

In one aspect, in the discharge configuration/phase, provision is made for expanding the working fluid in the turbine and in the additional turbine.

In one aspect, in the charge configuration/phase, provision is made for introducing the compressed working fluid through the primary heat exchanger, the primary additional heat exchanger and the secondary heat exchanger.

In one aspect, in the discharge configuration/phase, provision is made for introducing the working fluid coming from the tank through the secondary heat exchanger, the primary additional heat exchanger and the primary heat exchanger.

In one aspect, the closed circuit comprises or passes through: the compressor, the further heat exchanger, the turbine and an additional heat exchanger.

In one aspect, the additional compressor and the additional turbine are not part of the closed circuit and/or of the closed thermodynamic cycle (TC).

In one aspect, provision is made for increasing the pressure in the discharge configuration/phase by means of a pump.

In one aspect, a pump is operatively active on the return pipes and is configured for increasing the pressure in the discharge configuration/phase.

In one aspect, the pump is downstream of the tank, optionally between the secondary heat exchanger and the primary heat exchanger.

Further characteristics and advantages will be more evident from the detailed description of preferred but not exclusive embodiments of a plant and of a process for energy generation and storage in accordance with the present invention.

DESCRIPTION OF THE DRAWINGS

Such description will be set forth hereinbelow with reference to the enclosed drawings, provided only as a non-limiting example, in which:

FIG. 1 schematically illustrates an embodiment of an energy generation and storage plant according to the present invention in an operating configuration;

FIG. 2 is a T-S diagram relative to the operating configuration of FIG. 1;

FIG. 3 illustrates the plant of FIG. 1 in a different operating configuration;

FIG. 4 is a T-S diagram relative to the operating configuration of FIG. 3;

DETAILED DESCRIPTION

Figure 5:
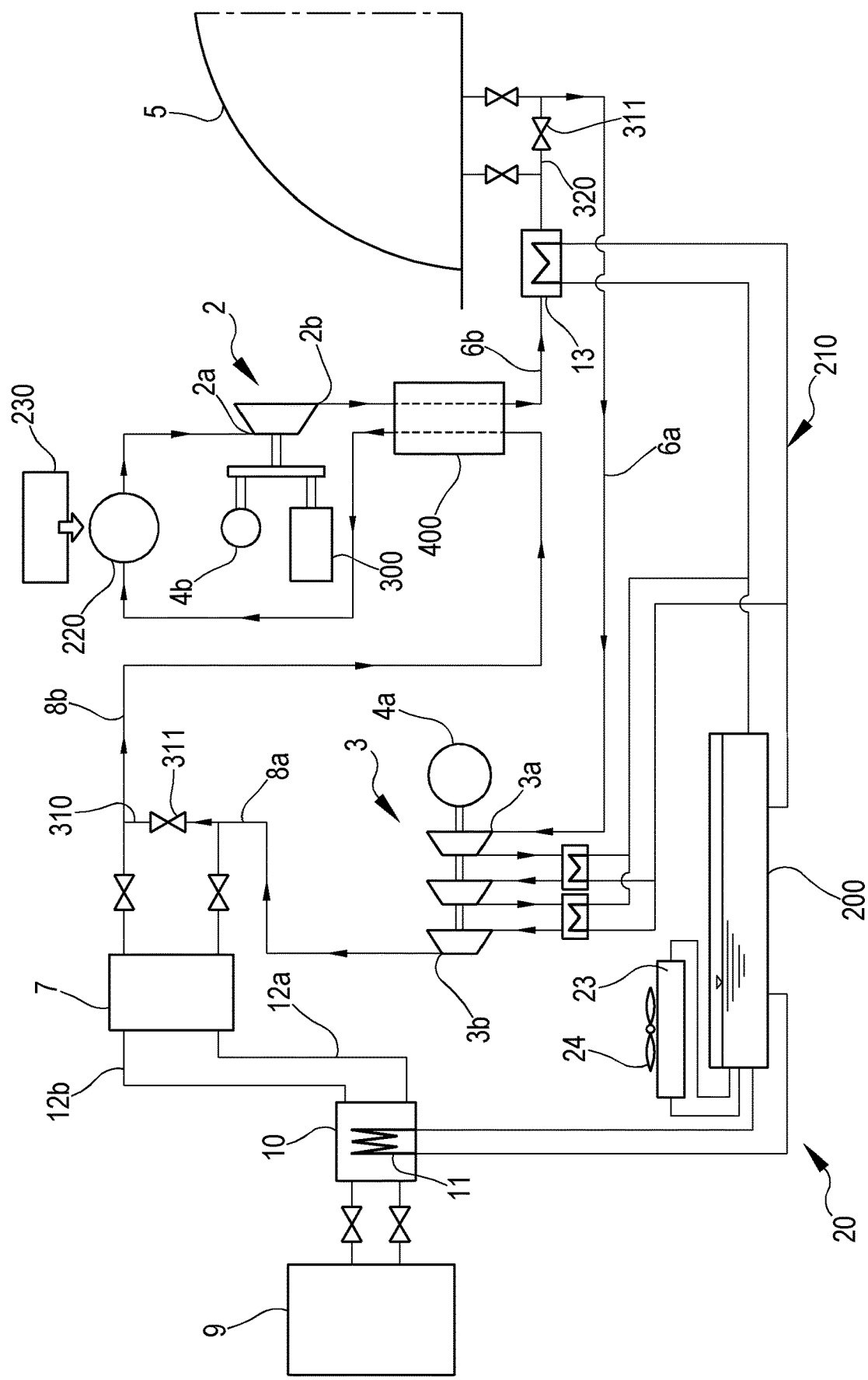
FIG. 5 illustrates an embodiment variant of an energy storage plant according to the present invention.

With reference to the enclosed figures, the reference number 1 overall indicates an energy generation and storage plant according to the present invention.

The plant 1 operates for example with a working fluid different from atmospheric air.

For example, the plant 1 operates with a working fluid chosen in the group comprising: carbon dioxide $CO_2$, sulfur hexafluoride $SF_6$, nitrous oxide $N_2O$. In the following description, the working fluid used in combination with the described plant 1 is carbon dioxide $CO_2$.

The plant 1 is configured to perform a closed cyclic thermodynamic transformation (CTT), first in one direction in a charge configuration/phase and then in an opposite direction in a discharge configuration/phase, in which in the charge configuration the plant 1 stores heat and pressure and in the discharge configuration the plant generates electrical and/or mechanical energy.

The plant 1 is also configured to define/delimit a closed circuit and to perform a closed thermodynamic cycle (TC) in said closed circuit with at least a part of the same working fluid, also while said plant 1 is in the charge configuration or in the discharge configuration.

With reference to FIG. 1, the plant 1 comprises a turbine 2 and a compressor 3. The compressor 3 is schematically illustrated as comprising three stages. The compressor 3 is connected to a motor 4a. The turbine 2 is mechanically connected to a generator 4b and to a driven machine 300, schematically represented in FIG. 1 and different from a generator. The turbine 2 is mechanically connected to the generator 4b to the driven machine 300 by means of a transmission, for example by means of connection devices, e.g. of friction type, which allow connecting and disconnecting, upon command, the turbine 2 to/from the generator 4 and/or to/from the driven machine.

The plant 1 comprises a casing 5 preferably defined by a pressure-balloon made of flexible material, for example made of PVC coated polyester fabric. The pressure-balloon is arranged on the surface and is externally in contact with the atmospheric air. The pressure-balloon delimits, at its interior, a volume configured to contain the working fluid at atmospheric pressure or substantially atmospheric pressure, i.e. in equilibrium of pressure with the atmosphere. The casing 5 can also be made as a gasometer or any other storage system for gas at low or zero over-pressure.

A first section 6a of delivery pipes is extended between the casing 5 and an inlet 3a of the compressor 3. A third section 6b of return pipes is extended between the casing 5 and an outlet 2b of the turbine 2 in order to place in fluid communication the internal volume of the casing 5 with said compressor 3 and turbine 2. A valve or a system of valves is operatively situated such sections 6a, 6b in order to alternately place in fluid communication the casing 5 with the inlet 3a of the compressor 3 or the outlet 2b of the turbine 2 with the casing 5.

The plant 1 comprises a primary heat exchanger 7 which can be selectively placed in fluid communication with an outlet 3b of the compressor 3 or with an inlet 2a of the turbine 2.

For such purpose, a second section 8a of the delivery pipes is extended between the outlet 3b of the compressor 3 and the primary heat exchanger 7. A second section 8b of the return pipes is extended between the primary heat exchanger 7 and the inlet 2a of the turbine 2. A valve, or a system of valves, is operatively situated on the sections 8a, 8b in order to alternately place in fluid communication the primary heat exchanger 7 with the inlet 2a of the turbine 2 or the outlet 3b of the compressor 3 with the primary heat exchanger 7.

A tank 9 is in fluid communication with the primary heat exchanger 7 and is configured to accumulate the working fluid in liquid or supercritical phase. The tank 9 is preferably made of metal with an external wall of cylindrical or spherical shape.

A secondary heat exchanger 10 is operatively active between the primary heat exchanger 7 and the tank 9, or in said tank 9, and is configured to operate on the stored working fluid or in charge phase in the tank 9.

According to that illustrated in the embodiment of FIG. 1, the secondary heat exchanger 10 is integrated in the tank 9 in the sense that it has a thermal exchange portion 11 thereof housed within the tank 9 and configured to be hit by the working fluid contained in said tank 9.

A third section 12a of the delivery pipes and a first section 12b of the return pipes are extended between the primary heat exchanger 7 and the tank 9 in order to place in fluid communication said primary heat exchanger 7 with said tank 9 and with said secondary heat exchanger 10.

A valve, or a system of valves, is operatively situated on the sections 12a, 12b in order to alternately place in fluid communication the compressor 3 with the primary heat exchanger 7 and with the tank 9 or the primary heat exchanger 7 and the tank 9 with the turbine 2.

The plant 1 also comprises an additional heat exchanger 13 operatively interposed between the turbine 2 and the casing 5 and a further heat exchanger 220 which receives heat from an additional heat source 230. The further heat exchanger 220 is situated on the second section 8b of the delivery pipes, between the inlet 2a of the turbine 2 and the primary heat exchanger 7. The additional heat source 230 is, as a non-limiting example, a solar source (e.g. solar field), industrial recovery residual heat (Waste Heat Recovery), gas turbine exhaust heat, etc.

The delivery pipes thereof comprise the respective first, second and third section 6a, 8a, 12a. The return pipes therefore comprise the respective first, second and third section 12b, 8b, 6b.

A first bypass conduit 310 is configured to connect the outlet of the compressor 3 with the further heat exchanger 220 and bypass the first heat exchanger 7 and the tank 9. The first bypass conduit 310 connects the second section 8a of the delivery pipes with the second section 8b of the return pipes and is provided with a respective first valve 311.

A second bypass conduit 320 is configured to connect the outlet 2b of the turbine 2 with the inlet 3a of the compressor 3 and bypass the casing 5. The second bypass conduit 320 connects the first section 6a of the delivery pipes with the third section 6b of the return pipes and is provided with a respective second valve 321.

The first and the second bypass conduit 310, 320 are capable of delimiting the closed circuit which comprises the compressor 3, the turbine 2, the additional heat exchanger 13 and the further heat exchanger 220.

The plant 1 also comprises a control unit, not illustrated, operatively connected to the different elements of the plant 1 itself and configured/programmed for managing the operation thereof.

The plant 1 is configured to operate in a charge configuration or in a discharge configuration, i.e. in order to execute a process comprising an energy charge phase and an energy discharge and generation phase.

The plant 1 is also configured to perform the closed thermodynamic cycle (TC) in the closed circuit, for example a Brayton cycle.

The configuration illustrated in FIG. 1 is a charge configuration/phase with simultaneous closed thermodynamic cycle (TC).

The plant 1 starts from a first state in which the working fluid ($CO_2$) in gaseous form is all contained in the casing 5 at atmospheric pressure or substantially atmospheric pressure and at a temperature substantially equal to the ambient temperature (point A of the T-S diagram of FIG. 2). The casing 5, by means of the system of valves, is placed in communication with the inlet 3a of the compressor 3. In addition, by means of the valves system, the primary heat exchanger 7 is placed in fluid communication with the outlet 3b of the compressor 3. The motor 4 drives the compressor 3 so as to compress the working fluid coming from the casing 5. The working fluid is compressed in the compressor 3 by means of an inter-cooled compression and is heated (from A to B of the T-S diagram of FIG. 2).

By means of controlling the valves, a part of the working fluid (e.g. 70%) is directed towards the primary heat exchanger 7 and another part (for example 30%) flows through the first bypass conduit 310 and flows towards the further heat exchanger 220.

The primary heat exchanger 7 works as a cooler to remove heat from the compressed working fluid, cool it (point C of the T-S diagram of FIG. 2) and store the thermal energy removed from said working fluid. In point C, the working fluid is found at a temperature lower than the critical temperature of said fluid and at a point on the right part of the Andrews curve or slightly outside the curve in conditions of slight overheating. The abovementioned compression can be adiabatic, inter-cooled or isothermal.

In embodiment variants, not illustrated in detail, provision is made for removing heat from the working fluid in the primary exchanger 7 up to bringing it, in a T-S diagram, to a temperature higher than the critical temperature and above the Andrews curve.

The working fluid enters into the tank 9 where the secondary heat exchanger 10, which in this configuration works as a cooler, removes further heat from the working fluid and stores further thermal energy. The working fluid traverses the saturated vapor zone until it reaches the liquid phase (point D of the T-S diagram of FIG. 2). The tank 9 therefore stores the working fluid in liquid phase at a temperature lower than a critical temperature Tc thereof. In this second state, the working fluid ($CO_2$, Tc=31° C.) in liquid form, e.g. at 20° C., is entirely contained in the tank 9. The secondary heat exchanger 10 and the primary heat exchanger 9 are therefore configured for operating a sub-critical transformation of the working fluid in a manner such that said working fluid is accumulated in the tank 9 in liquid phase.

In embodiment variants, not illustrated in detail, provision is made for removing heat from the working fluid in the secondary heat exchanger 10, bringing it into supercritical phase and making it follow the right part of the Andrews curve.

The part of the working fluid (30%) which operates according to the closed thermodynamic cycle (TC) is heated in the further heat exchanger 220 (up to the point E of the T-S diagram of FIG. 2), then enters into the turbine 2 where it expands and cools (up to point F of the T-S diagram of FIG. 2). The turbine 2 transforms the energy of the working fluid into electrical energy by means of the generator 4b and/or into mechanical energy in the driven machine 300. The part of the working fluid is then cooled in the additional heat exchanger 13 (and brought back to point A of the T-S diagram of FIG. 2), traverses the second bypass conduit 320 and is re-introduced into the compressor 3 in order to newly start the closed thermodynamic cycle (TC).

In the embodiment illustrated in FIGS. 1 and 3, the additional heat exchanger 13 is placed on the third section 6b of the return pipes and then works in the closed thermodynamic cycle (TC), but it does not operate on the working fluid that is stored in the charge configuration/phase.

When the charge phase has terminated and 70% of the working fluid is accumulated in the tank 9, the closed thermodynamic cycle (TC) with the remaining 30% can still proceed, due to the heat provided to the additional heat source 230.

The configuration illustrated in FIG. 3 is a discharge configuration/phase with simultaneous closed thermodynamic cycle (TC).

The plant 1 starts from the second state (point G of the T-S diagram of FIG. 4). The casing 5, by means of the valves system, is placed in communication with the outlet 2b of the turbine 2. In addition, by means of the system of valves, the primary heat exchanger 7 is placed in fluid communication with the inlet 2a of the turbine 2.

The secondary heat exchanger 10 works as a heater and transfers part of the heat, previously stored in the charge configuration, to the working fluid in the tank 9. The working fluid traverses the saturated vapor zone up to reaching the vapor phase (point H of the T-S diagram of FIG. 4). The working fluid traverses the primary heat exchanger 7 that now works as a heater and transfers further heat, previously stored in the charge configuration, to the working fluid and heats it (point I of the T-S diagram of FIG. 4).

The working fluid then traverses the further heat exchanger 220 (which receives heat from an additional heat source 230) and is further heated (up to point L of the T-S diagram of FIG. 4).

The heated working fluid enters into the turbine 2, it expands and cools (point M of the T-S diagram of FIG. 4) and determines the rotation of the turbine 2. The generator 4b coupled to the turbine 2 and the driven machine 300 are rotated by the turbine 2 driven by the working fluid under expansion. The expansion of the working fluid in the turbine can be adiabatic, inter-heated or isothermal.

The working fluid exiting from the turbine 2 is cooled in the additional heat exchanger 13 (point N of the T-S diagram of FIG. 4). The additional heat exchanger 13 (placed on the third section 6b of the return pipes) works in the closed thermodynamic cycle (TC) and also operates on the working fluid which is discharged in the discharge configuration/phase. In further embodiment variants, not illustrated in detail, it is provided that the additional heat exchanger 13 be placed on the first section 6a of the delivery pipes or both on the first section 6a of the delivery pipes and/or on the third section 6b of the return pipes.

At this point, by means of controlling the valves, a part of the working fluid (for example 70%) is directed towards the casing 5 and returns in the casing 5 at atmospheric pressure or substantially atmospheric pressure. Another part (e.g. 30%) flows through the second bypass conduit 320 and is once again sent to the compressor 2 and then through the first bypass conduit 310, in order to newly execute the closed thermodynamic cycle (TC).

When the discharge phase is terminated and 70% of the working fluid is accumulated in the casing 5, the closed thermodynamic cycle (TC) with the remaining 30% can still proceed, due to the heat supplied to the additional heat source 230.

For example, a temperature of the working fluid ($CO_2$) stored in the tank 9 is 24° C. and a pressure of the working fluid stored in the tank 9 is 65 bar. The density of the $CO_2$ at 25° C. and at atmospheric pressure is about 1.8 kg/m$^3$. The density of the $CO_2$ in the tank 9 is about 730 kg/m$^3$. The ratio between the density of the working fluid when it is contained in the tank 9 in the above-indicated conditions and the density of the same working fluid when it is contained in the casing 5 at atmospheric conditions is therefore about 400. On such matter, it is observed that if in place of the $CO_2$ one uses atmospheric air stored at 65 bar and 24° C. in the tank 9, its density would only be 78 kg/m$^3$ and the volume of the tank 9 that would be theoretically necessary would be about ten times more.

The primary heat exchanger 7 can be a heat regenerator with fixed bed comprising a thermal mass constituted, for example, by metal spheres. In the charge configuration/phase, the thermal mass is hit by the hot and compressed working fluid, which transfers heat to the metal spheres, which accumulate thermal energy. In the discharge configuration/phase, the thermal mass is hit by the cold working fluid, which absorbs heat from the metal spheres and is heated. In a non-illustrated variant, the heat regenerator can also be of the type with movable bed.

The primary heat exchanger 7 is therefore a thermal storage (Thermal Energy Storage TES). In place of the heat regenerator with fixed bed, other types can be present, such as those illustrated in the public document WO/2020/039416, in the name of the same Applicant.

Also different types of the secondary heat exchanger 10 are, for example, illustrated in the public document WO/2020/039416, in the name of the same Applicant FIG. 5 illustrates a variant of the plant 1. Here, the main elements common to FIG. 1 are visible, i.e. the turbine 2, the compressor 3, the motor 4a, the generator 4b, the driven machine 300, the casing 5, the primary heat exchanger 7 (thermal storage TES), the tank 9, the secondary heat exchanger 10, the further heat exchanger 220, the additional heat exchanger 13.

In such variant, the secondary heat exchanger 10 is interposed between the primary heat exchanger 7 and the tank 9, i.e. it is not integrated in the tank 9. The secondary heat exchanger 10 is in line on the third section 12a of the delivery pipes and on the first section 12b of the return pipes.

The secondary heat exchanger 10 illustrated in FIG. 5 comprises a secondary circuit 20 traversed by a secondary fluid, e.g. water. The secondary circuit 20 has a thermal exchange portion 11 which is hit by the working fluid that traverses the third section 12a of the delivery pipes and the first section 12b of the return pipes and is configured for exchanging heat with the working fluid.

The secondary circuit 20 comprises a secondary storage chamber 200, for the hot secondary fluid accumulated after having removed heat from the working fluid in the charge configuration/phase of the apparatus/process and for the cold secondary fluid accumulated after having transferred heat to the working fluid in the discharge configuration/phase of the apparatus/process. The abovementioned secondary storage chamber 200 is also coupled to a radiator 23 provided with one or more fans 24 placed on a recirculation duct which, for example, cools the secondary fluid during the night and heats it during the day. The abovementioned secondary storage chamber 200 is also connected, by means of a respective circuit 210, to the additional heat exchanger 13 and to inter-coolers 322 coupled to the compressor 3.

The plant 1 also comprises a recuperator 400 operatively active between the primary heat exchanger 7 and the further heat exchanger 220 and between the outlet of the turbine 2 and the additional heat exchanger 13. The recuperator 400 is therefore operatively coupled to the second and to the third section 8b, 6b of the return pipes and allows actuating a recuperative closed thermodynamic cycle (TC).

FIGS. 6-11 illustrate a further variant of the plant 1 and of the process according to the present invention. Unlike the plant 1 and process of FIGS. 1-4, the plant 1 of this variant allows actuating the closed thermodynamic cycle (TC) with lower and higher pressures that are respectively different from the maximum and minimum pressures of the cyclic thermodynamic transformation (CTT) in the charge configuration/phase and in the discharge configuration/phase. In particular, the higher pressure is lower than the maximum pressure of the cyclic thermodynamic transformation (CTT) in the charge configuration/phase. The lower pressure is higher than the minimum pressure of the cyclic thermodynamic transformation (CTT) in the discharge configuration/phase, preferably higher than atmospheric pressure.

For such purpose, the plant 1 comprises an additional compressor 3', an additional turbine 2' and a primary additional heat exchanger 7'. In addition, the motor 4a and the generator 4b are defined by a single motor generator 4 connected by means of respective transmissions to the compressor 3, to the additional compressor 3', to the turbine 2, to the additional turbine 2'. Connection devices, for example of friction type, are interposed between the motor generator 4 and the turbine 2 and the additional turbine 2' and between the motor generator 4 and the compressor 3 and the additional compressor 3' and are configured for connecting and disconnecting, upon command, such rotary machines to/from the motor generator 4.

The primary additional heat exchanger 7' is situated between the primary heat exchanger 7 and the secondary heat exchanger 10 or, in other words, is operative on the third section 12a of the delivery pipes and on the first section 12b of the return pipes. Also the primary additional heat exchanger 7' can be a thermal storage (Thermal Energy Storage TES).

The additional compressor 3' is situated between the primary heat exchanger 7 and the secondary heat exchanger 10, i.e. it is operative on the third section 12a of the delivery pipes and on the first section 12b of the return pipes. The primary heat exchanger 7 is in fluid communication with an inlet 3'a of the additional compressor 3' while an outlet 3'b of the additional compressor 3 is in fluid communication with the primary additional heat exchanger 7'.

The additional turbine 2' is situated between the primary heat exchanger 7 and the secondary heat exchanger 10, i.e. the primary additional heat exchanger 7' is in fluid communication with an inlet 2'a of the additional turbine 2' while an outlet 2'b of the additional turbine 2' is in fluid communication with the primary heat exchanger 7.

In this embodiment, through the primary heat exchanger 7, only one pipe 500 passes or a plurality of pipes pass which carries/carry out both the delivery function, when the plant 1 is in the charge configuration/phase, and the return function, when the plant 1 is in the discharge configuration/phase. The second section 8a of the delivery pipes and the second section 8b of the return pipes are connected to each other and to the single pipe 500 on one side of the primary exchanger 7. The third section 12a of the delivery pipes and the first section 12b of the return pipes are connected to each other and to the single pipe 500 on the other side of the primary exchanger 7. In addition, the first section 6a of the delivery pipes and the third section 6b of the return pipes are joined in a single duct 600 connected to the casing 5.

An additional heat exchanger 13' is situated on said single duct 600. The closed circuit is defined by the first section 6a of the delivery pipes, by the second section 8a of the delivery pipes, by the second section 8b of the return pipes and by the third section 6b of the return pipes. The closed circuit comprises or passes through: the compressor 3, the further heat exchanger 220, the turbine 2 and the additional heat exchanger 13.

Figure 8:
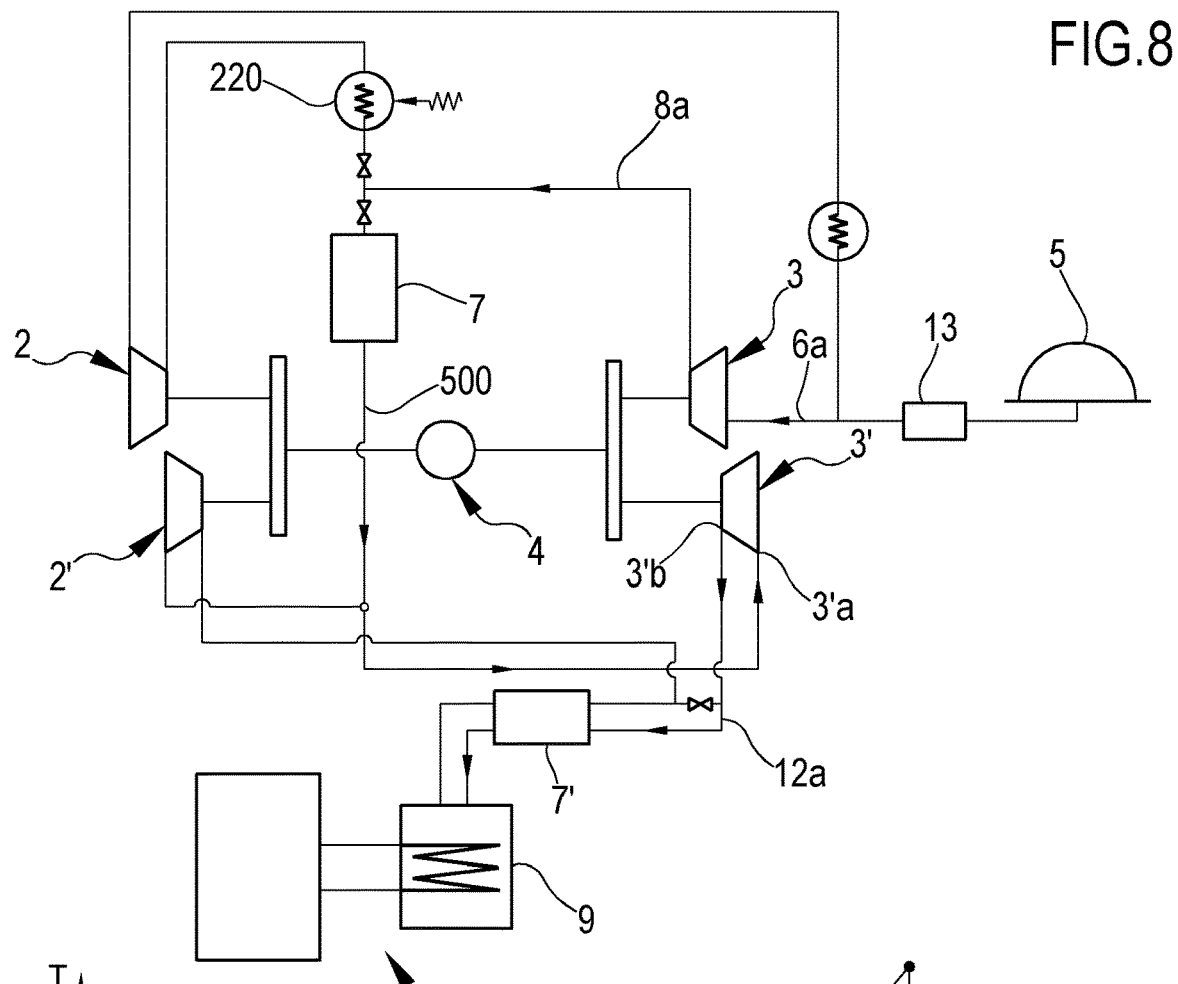
Figure 9:
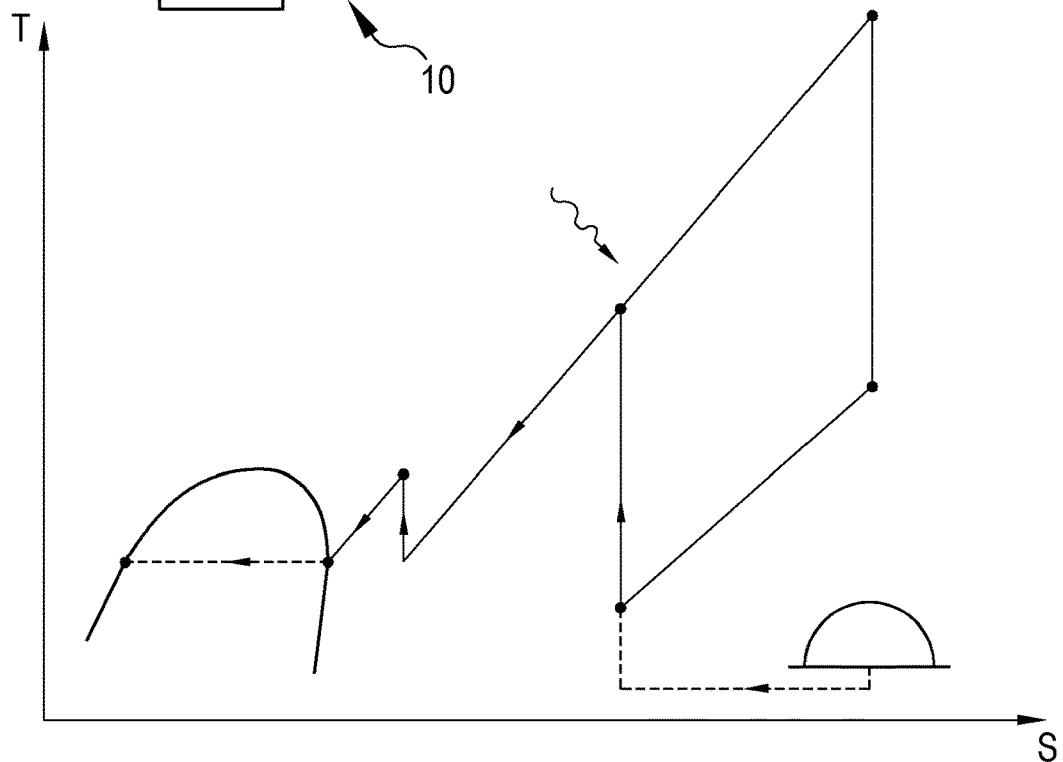

In the charge configuration/phase, provision is made for compressing the working fluid both in the compressor 3 and in the additional compressor 3' and for introducing the compressed working fluid through the primary heat exchanger 7, the primary additional heat exchanger 7' and the secondary heat exchanger 10 (FIGS. 8 and 9).

Figure 10:
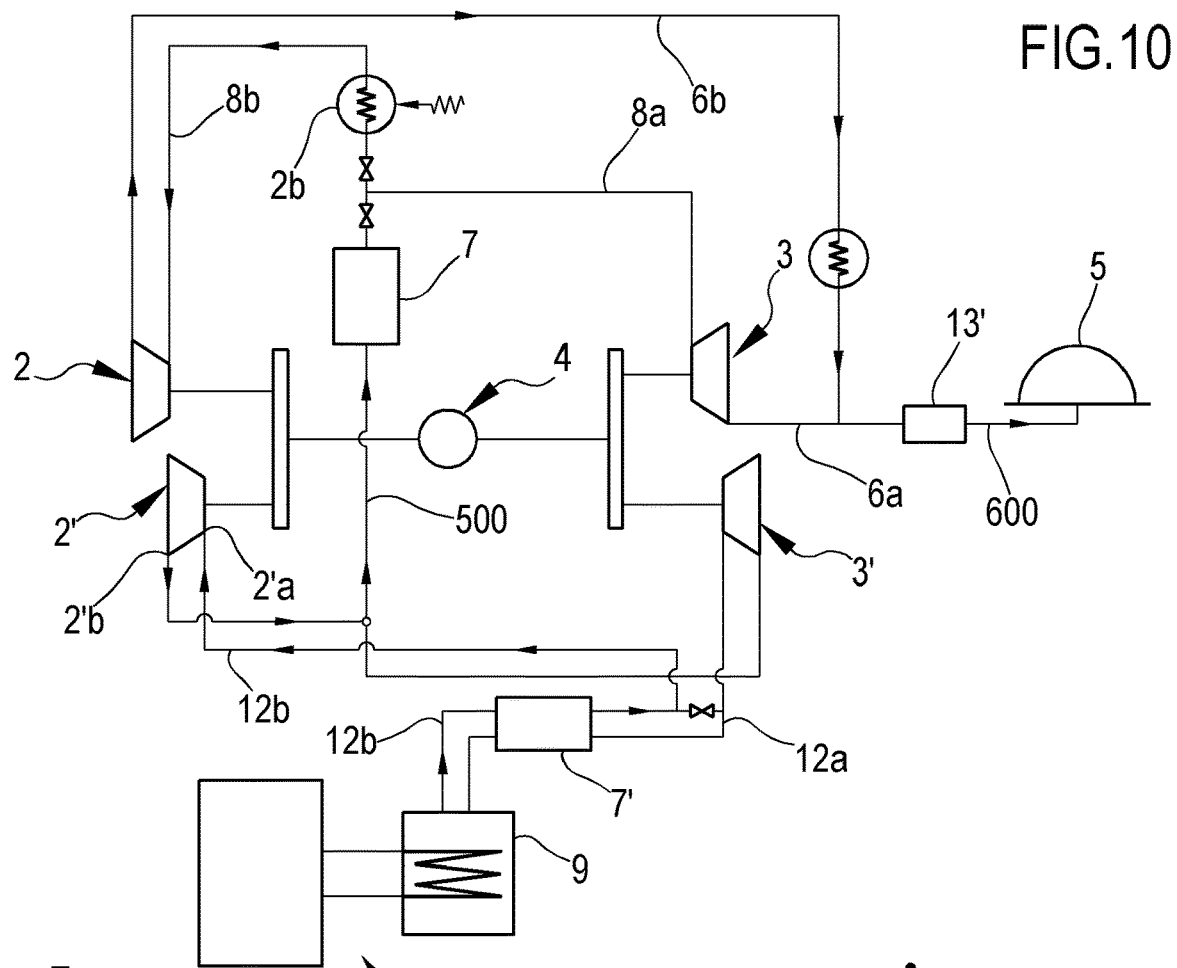
Figure 11:
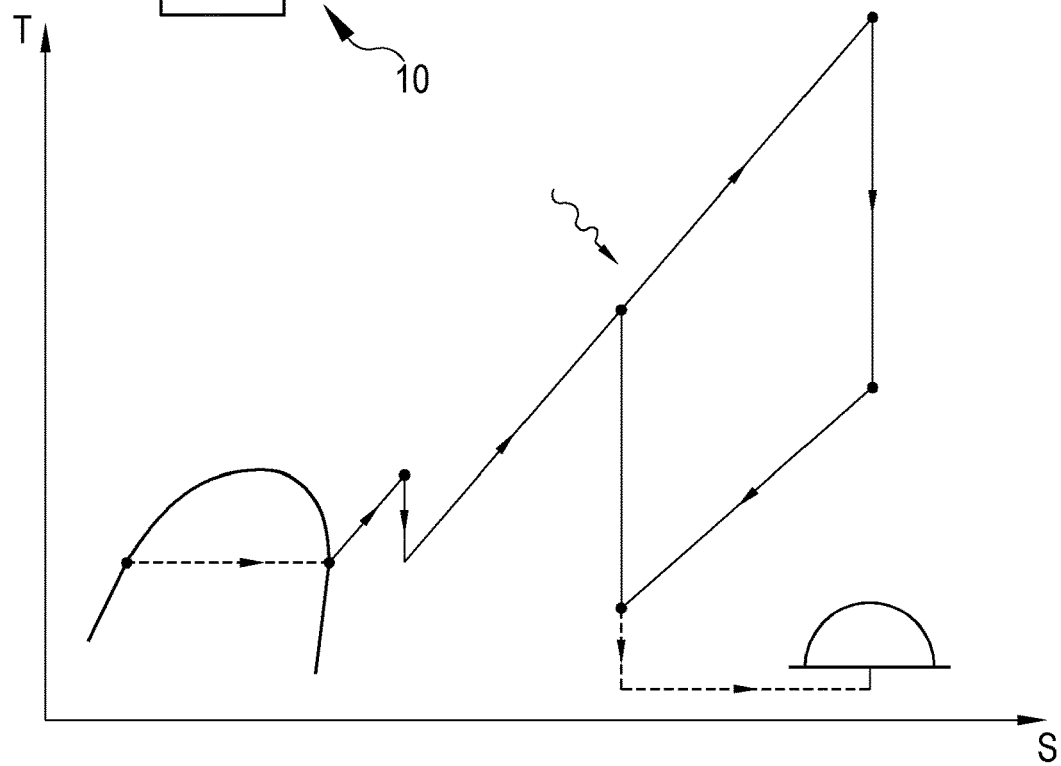

In the discharge configuration/phase, provision is made for expanding the working fluid in the turbine 2 and in the additional turbine 2' and for introducing the working fluid coming from the tank through the secondary heat exchanger 10, the primary additional heat exchanger 7' and the primary heat exchanger 7 (FIGS. 10 and 11).

Figure 6:
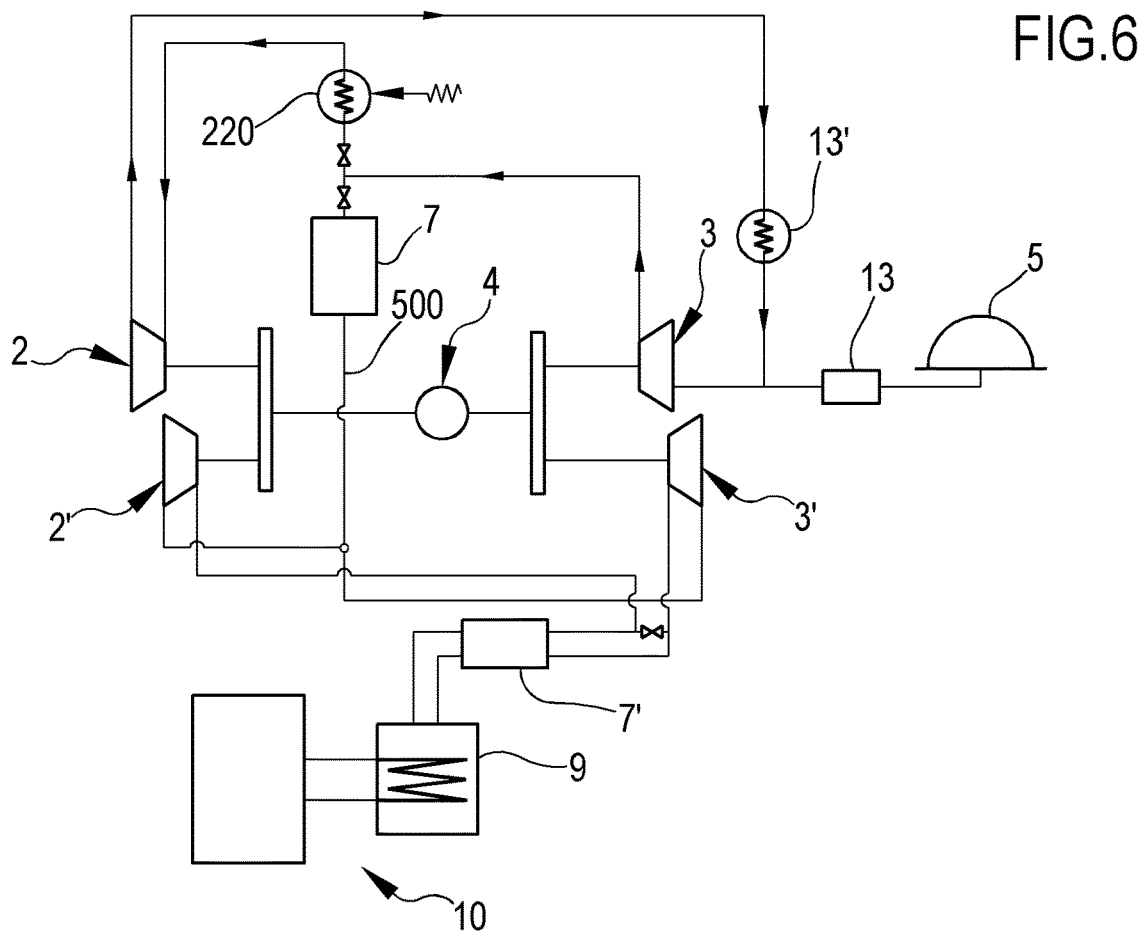
FIGS. 6, 8 and 10 illustrate a different embodiment variant of the plant in respective operating configurations.
Figure 7:
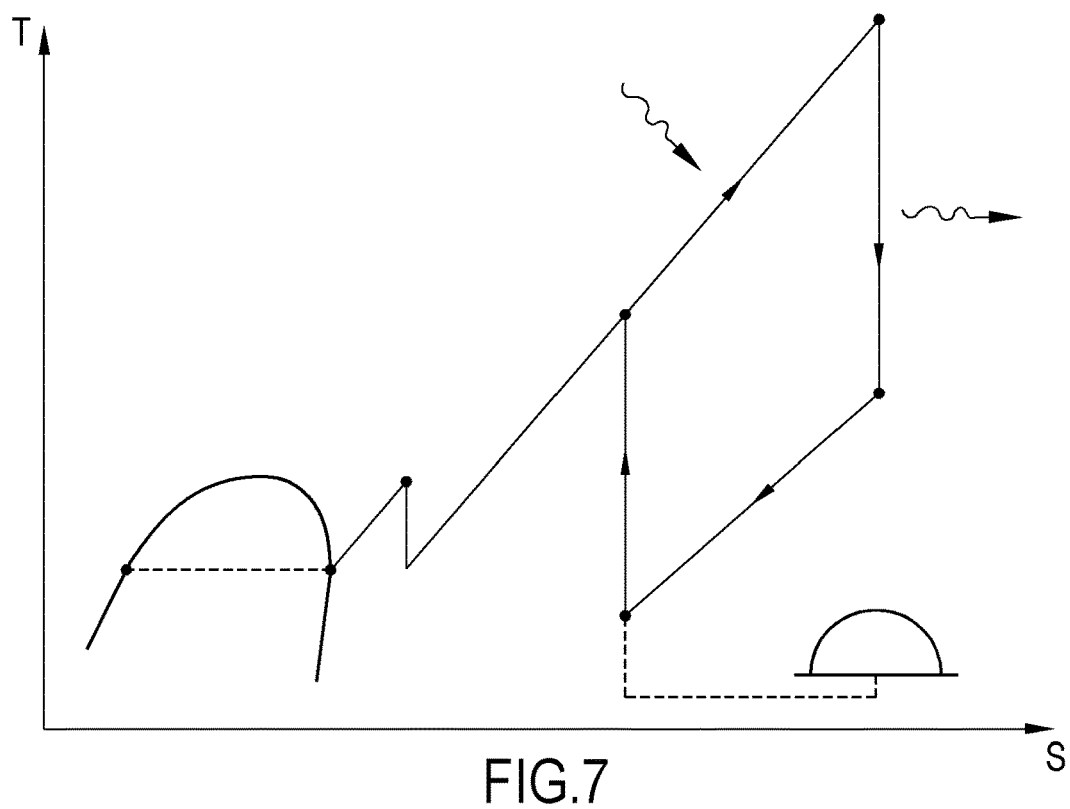
FIGS. 7, 9 and 11 are T-S diagrams relative to the operating configurations of FIGS. 6, 7 and 8.

The additional compressor 3' and the additional turbine 2' are therefore not part of the closed circuit and/or of the closed thermodynamic cycle (TC, FIGS. 6 and 7).

Figure 12:
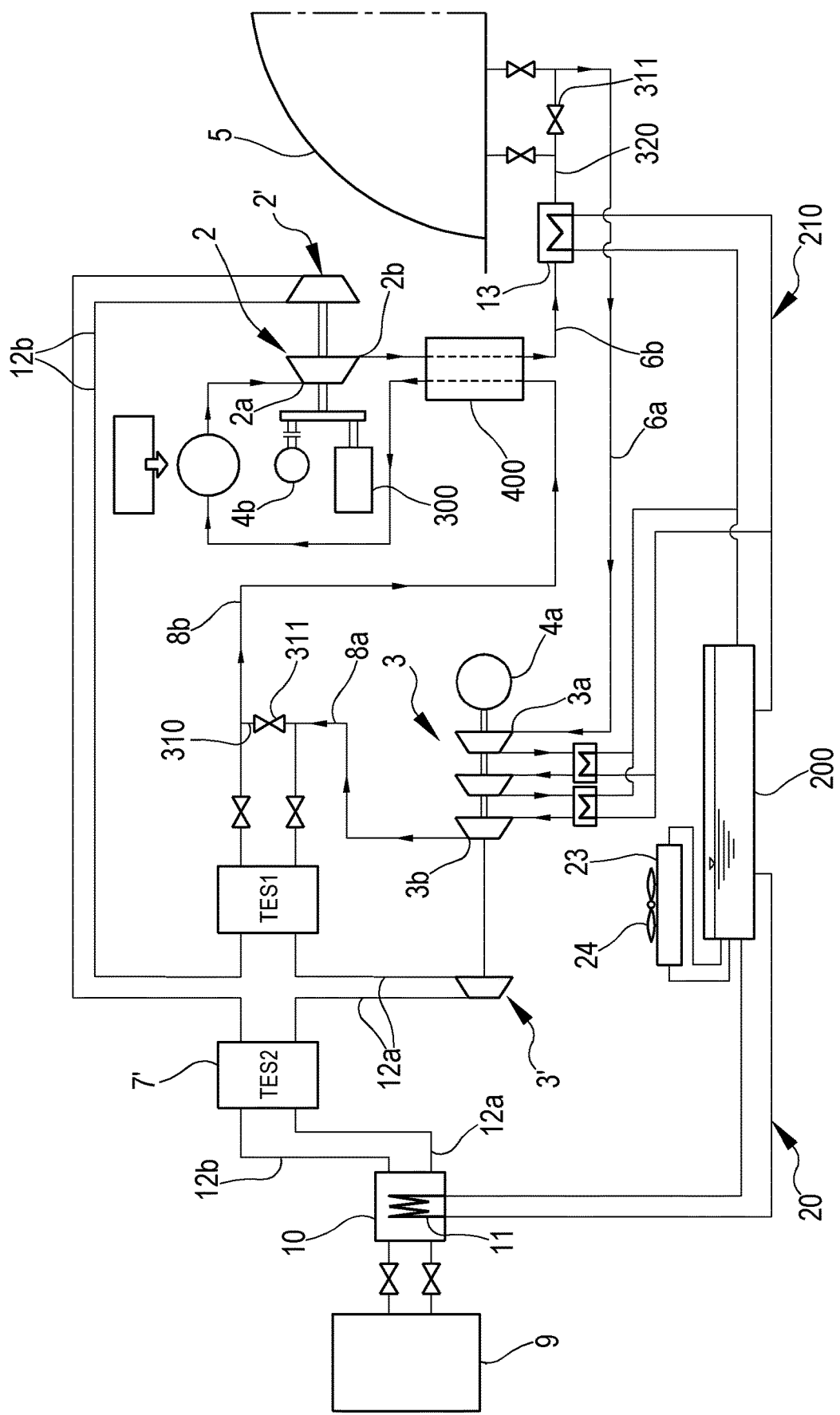
FIG. 12 illustrates a further embodiment variant of an energy storage plant according to the present invention.
Figure 13:
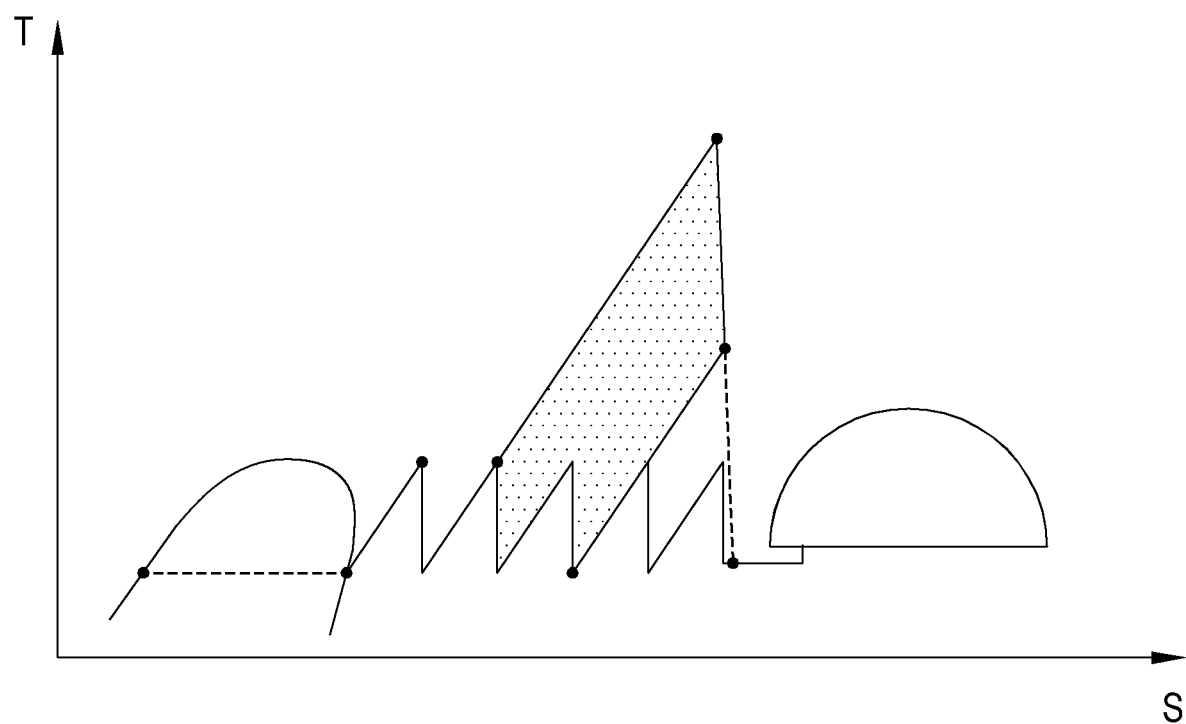
FIG. 13 illustrates a further T-S diagram relative to the invention.

FIG. 12 illustrates a further variant, similar to that of FIG. 5 but, as with the plant of FIGS. 6-11, such configuration allows actuating the closed thermodynamic cycle (TC) with lower and higher pressures that are respectively different from the maximum and minimum pressures of the cyclic thermodynamic transformation (CTT) in the charge configuration/phase and in the discharge configuration/phase. A T-S diagram relative to such transformations is illustrated in FIG. 13. Unlike FIG. 5, an auxiliary turbine 2' is placed on the first section 12b of the return pipes and an auxiliary compressor 3' is placed on the third section 12a of the delivery pipes. A primary additional heat exchanger 7' is operative both on the first section 12b of the return pipes and on the third section 12a of the delivery pipes.

Figure 14:
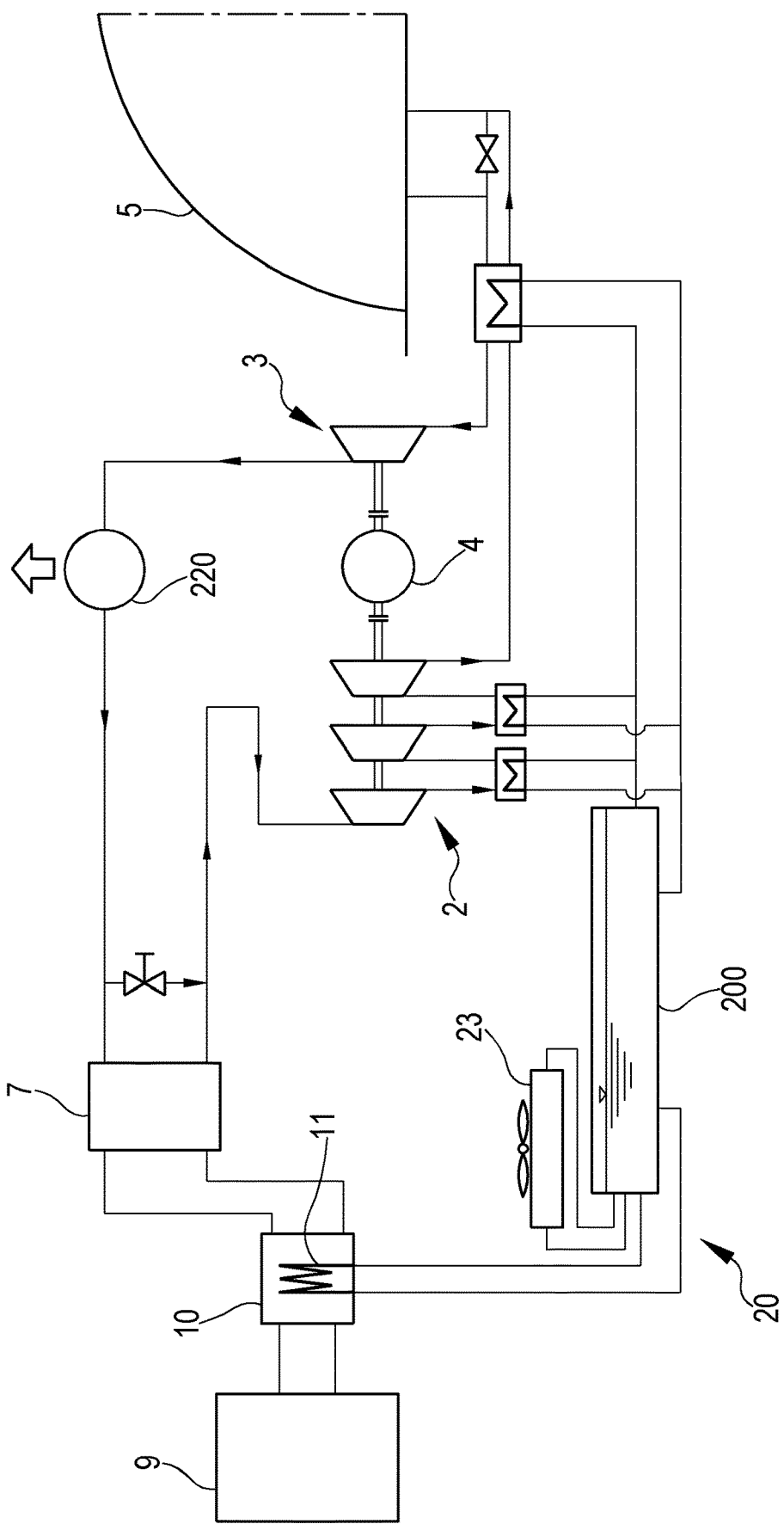
FIG. 14 illustrates a further embodiment variant of an energy storage plant according to the present invention.

FIG. 14 illustrates a further variant in which the closed thermodynamic cycle (TC) is that of a heat pump. The compressor 3 is not inter-cooled while the turbine 2 is multi-stage and has multiple inter-heatings (re-heatings). The generated heat is released through the further heat exchanger 220 to a user.

Figure 15:
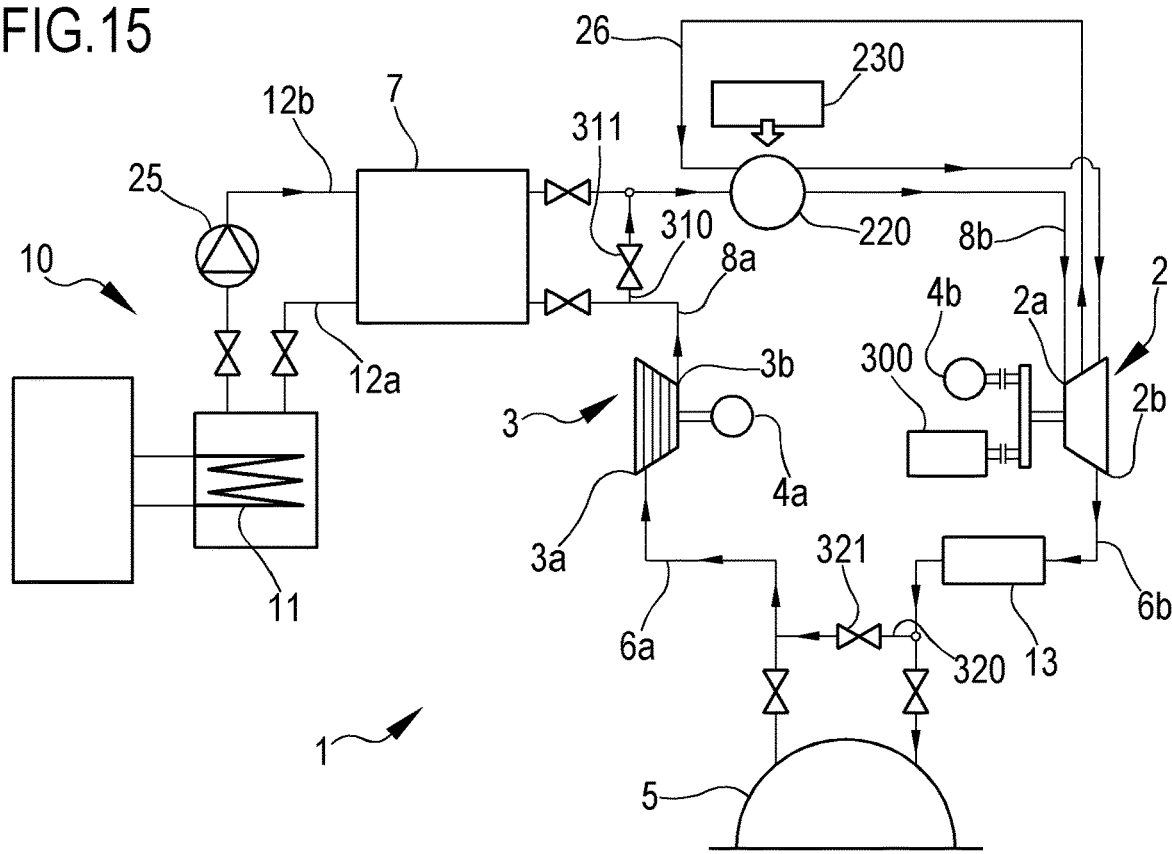
FIG. 15 illustrates a variant of the plant of FIG. 3.

FIG. 15 illustrates a variant of the plant of FIG. 3 in the discharge configuration/phase with simultaneous closed thermodynamic cycle (TC).

Figure 16:
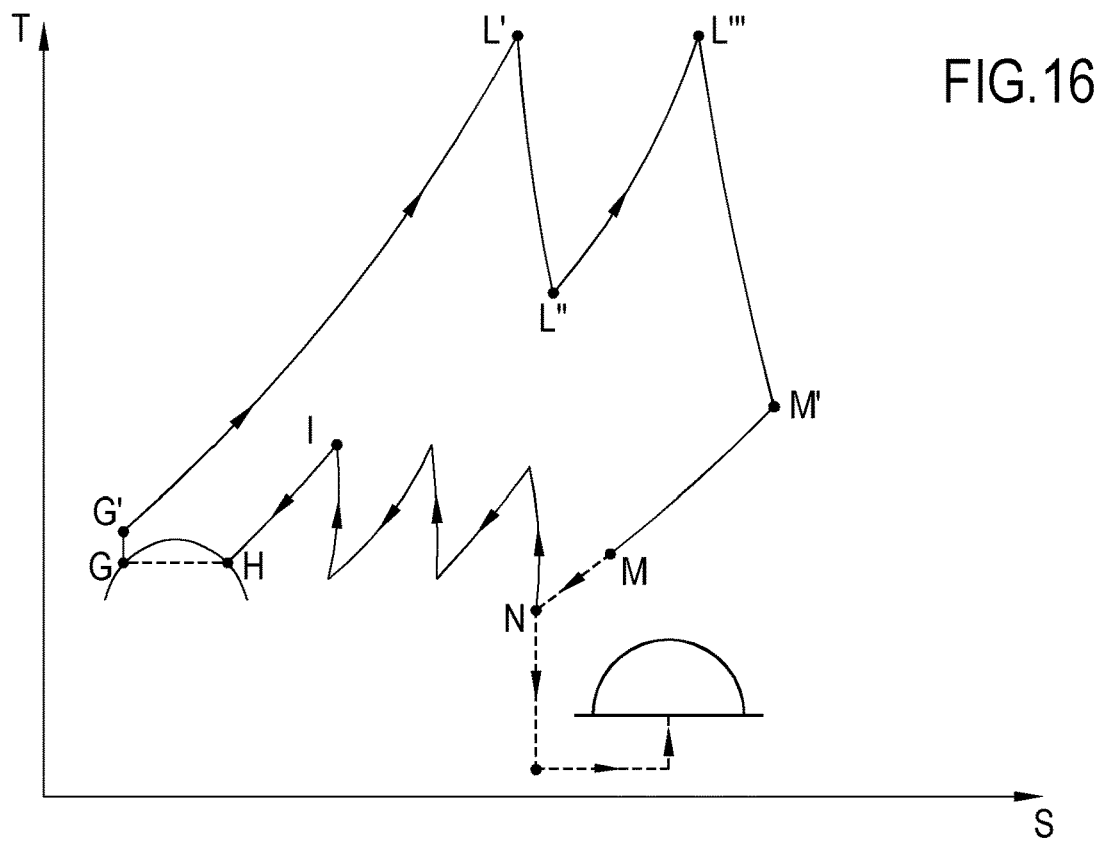
FIG. 16 is a T-S diagram relative to the operating configuration of FIG. 15.

With respect to that described with reference to FIG. 3, the plant of FIG. 15 also comprises a pump 25 arranged on the first section 12b of the return pipes, i.e. between the secondary heat exchanger 10 and the primary heat exchanger 7. The function of the pump 25 is that of increasing the pressure in the discharge configuration/phase (from G to G', as illustrated in FIG. 16) by drawing the liquid working fluid from the tank 9 and sending it at a higher pressure, even supercritical, so as to have a greater expansion gradient. In this manner, the specific work of the cycle is increased and this allows reducing the size of the storage tanks given the same stored energy.

The plant of FIG. 16 also illustrates the abovementioned inter-heating operated between stages of the turbine 2 by an inter-heating circuit 26 (illustrated in FIG. 15). The inter-heating circuit 26 connects the turbine 2 with the further heat exchanger 220. In this embodiment, in the discharge configuration/phase the working fluid under expansion in the turbine 2 (from L' to L" and then from L''' to M' in FIG. 16) is heated (from L" to L''' in FIG. 16) to about half expansion by the heat of the additional heat source 230. The inter-heating (re-heating) to about half expansion serves to increase the specific work inside the cycle. Also this allows reducing the size of the storage tanks given the same stored energy.

As can be observed in this embodiment, the fluid part which operates in the closed thermodynamic cycle (TC) follows the I-H-G path of the T-S diagram also in the discharge configuration/phase (illustrated in FIG. 16).

In further variants, not illustrated in the figures, the plant 1 can alternatively comprise the pump 25 or the inter-heating circuit 26.

LIST OF ELEMENTS

1 energy storage plant
2 turbine
2' additional turbine 2a turbine inlet
2b turbine outlet
3 compressor
3' additional compressor
3a compressor inlet
3b compressor outlet
4 motor generator
4a motor
4b generator
5 casing
6a delivery pipes first section
6b return pipes third section
7 primary heat exchanger
7' primary additional heat exchanger
8a delivery pipes second section
8b return pipes second section
9 tank
10 secondary heat exchanger
11 thermal exchange portion of the secondary heat exchanger
12a third section delivery pipes
12b first section return pipes
13 additional heat exchanger
13' additional auxiliary heat exchanger
20 secondary circuit
23 radiator
24 fans
25 pump
26 inter-heating circuit
200 secondary storage chamber
210 circuit of the additional heat exchanger
220 further heat exchanger
230 additional heat source
300 driven machine
310 first bypass conduit
311 first valve
320 second bypass conduit
321 second valve
322 inter-coolers
400 recuperator
500 single pipe
600 single duct

The invention claimed is:
1. An energy generation and storage plant, comprising:
a working fluid other than atmospheric air;
a casing configured to store the working fluid in a gaseous phase and in equilibrium of pressure with the atmosphere;
a tank configured to store said working fluid in liquid or supercritical phase with a temperature close to the critical temperature;
wherein said critical temperature is close to the ambient temperature;
wherein the plant is configured to perform a closed cyclic thermodynamic transformation, first in one direction in a charge configuration and then in an opposite direction in a discharge configuration, between said casing and said tank;
wherein in the charge configuration the plant stores heat and pressure and in the discharge configuration the plant generates energy;
wherein the plant is further configured to define a closed circuit and to perform a closed thermodynamic cycle in said closed circuit with at least part of said working fluid;
wherein the plant further comprises:
a compressor and a motor mechanically connected to each other;
a turbine and a generator or a driven machine mechanically connected to each other;
said casing externally in contact with the atmosphere and delimiting, at the interior thereof, a volume configured to contain the working fluid at atmospheric pressure or substantially atmospheric pressure, wherein said volume is selectively in fluid communication with an inlet of the compressor or with an outlet of the turbine;
a primary heat exchanger selectively in fluid communication with an outlet of the compressor or with an inlet of the turbine;
said tank in fluid communication with the primary heat exchanger to accumulate the working fluid;
a secondary heat exchanger operationally active between the primary heat exchanger and the tank or in said tank;
an additional heat exchanger operatively interposed between the casing and the compressor and/or between the casing and the turbine; and
a further heat exchanger operatively interposed between the turbine and the primary heat exchanger;
wherein, in the charge configuration, the casing is in fluid communication with the inlet of the compressor and the primary heat exchanger is in fluid communication with the outlet of the compressor, the turbine is at rest, the motor is operating and drives the compressor to compress the working fluid coming from the casing, the primary heat exchanger works as a cooler to remove heat from the compressed working fluid, cool it and store thermal energy, the secondary heat exchanger works as a cooler to remove further heat from the compressed working fluid and store further thermal energy, the tank receives and stores the compressed and cooled working fluid, wherein the working fluid stored in the tank has a temperature close to its own critical temperature;
wherein, in the discharge configuration, the casing is in fluid communication with the outlet of the turbine and the primary heat exchanger is in fluid communication with the inlet of the turbine, the compressor is at rest, the secondary heat exchanger works as a heater to release heat to the working fluid coming from the tank, the primary heat exchanger works as a heater to release further heat to the working fluid and heat it, the turbine is rotated by the heated working fluid and drives the generator and/or the driven machine, generating energy, the working fluid returns in the casing to atmospheric or substantially atmospheric pressure;
wherein, in said closed circuit, the outlet of the compressor is in fluid communication with the further heat exchanger, the outlet of the turbine is in fluid communication with the inlet of the compressor, and said additional heat exchanger is operatively interposed between the outlet of the turbine and the inlet of the compressor; and
wherein the plant further comprises:
a first bypass conduit comprising a respective first valve, wherein the first bypass conduit is configured to connect the outlet of the compressor with the further heat exchanger and to bypass the primary heat exchanger and the tank; and
a second bypass conduit comprising a respective second valve, wherein the second bypass conduit is configured to connect the outlet of the turbine with the inlet of the compressor and to bypass the casing.

2. The plant according to claim 1, wherein the working fluid has the following chemical-physical properties: critical temperature between 0° C. and 200° C., density at 25° C. between 0.5 kg/m³ and 10 kg/m³.

3. The plant according to claim 1, wherein the first valve and the second valve can be throttled to adjust a flow of working fluid in the closed thermodynamic cycle.

4. The plant according to claim 1, further comprising a recuperator operatively active between the primary heat exchanger and the further heat exchanger and between the outlet of the turbine and the additional heat exchanger.

5. The plant according to claim 1, wherein the compressor is multi-stage and inter-cooled.

6. The plant according to claim 1, wherein the turbine is a multi-stage turbine and the further heat exchanger is in fluid connection with at least one stage of the turbine in order to inter-heat said turbine.

7. The plant according to claim 1, wherein a pump is placed between the secondary heat exchanger and the primary heat exchanger and is configured for increasing the pressure in the discharge configuration.

8. A process for energy generation and storage implemented with the plant according to claim 1, wherein the process comprises:
carrying out a closed cyclic thermodynamic transformation, first in one direction in a charge configuration/phase and then in an opposite direction in a discharge configuration/phase, between the casing for the storage of the working fluid different from atmospheric air, in a gaseous phase and in pressure equilibrium with the atmosphere, and the tank for the storage of said working fluid in a liquid or supercritical phase with a temperature close to the critical temperature; wherein, in the charge phase, the process accumulates heat and pressure and in the discharge phase generates energy;
carrying out, with at least a part of said working fluid, a closed thermodynamic cycle (TC), optionally simultaneously with the charge phase or the discharge phase.

9. The process according to claim 8, wherein the charge phase comprises:
compressing in a compressor said working fluid, coming from said casing externally in contact with the atmosphere and delimiting at the interior thereof a volume configured to contain the working fluid at atmospheric pressure or substantially atmospheric, absorbing energy;
introducing the compressed working fluid through a primary heat exchanger and a secondary heat exchanger placed in series to bring a temperature of the working fluid close to its own critical temperature; wherein the primary heat exchanger works as a cooler to remove heat from the compressed working fluid, cool it and store thermal energy, wherein the secondary heat exchanger works as a cooler to remove further heat from the compressed working fluid and store further thermal energy;
accumulating the cooled working fluid in said tank; wherein the secondary heat exchanger and the primary heat exchanger carry out a super-critical transformation of the working fluid so that said working fluid is accumulated in the tank in super-critical phase or wherein the secondary heat exchanger and the primary heat exchanger carry out a sub-critical transformation of the working fluid so that said working fluid is accumulated in the tank in liquid phase.

10. The process according to claim 9, wherein the discharge phase comprises:
passing the working fluid, coming from the tank, through the secondary heat exchanger and the primary heat exchanger; wherein the secondary heat exchanger works as a heater to transfer heat to the working fluid coming from the tank, wherein the primary heat exchanger works as a heater to transfer further heat to the working fluid and heat it;
passing the heated working fluid through a turbine, wherein the turbine is rotated by the heated working fluid and drives a generator and/or a driven machine, generating energy, wherein the working fluid expands and cools down in the turbine;
re-introducing the working fluid coming from the turbine into the casing at atmospheric or substantially atmospheric pressure.

11. The process according to claim 9, wherein the closed thermodynamic cycle comprises:
compressing at least a part of said working fluid into the compressor;
passing said at least a part of said working fluid through a further heat exchanger operatively associated with an additional heat source;
expanding said at least a part of said heated working fluid through the turbine, wherein the turbine is rotated by the heated working fluid and drives the generator or the driven machine, generating energy, wherein the working fluid expands and cools in the turbine;
cooling said at least a part of said working fluid in an additional heat exchanger and re-introducing said at least a part of said working fluid into the compressor.

12. The process according to claim 9, wherein the compression of the working fluid in the compressor is inter-cooled.

13. The process according to claim 8, in which the closed thermodynamic cycle has a higher pressure and a lower pressure; wherein the higher pressure is equal to or lower than the maximum pressure of the cyclic thermodynamic transformation in the charge configuration/phase; wherein the lower pressure is equal to or higher than the minimum pressure of the cyclic thermodynamic transformation in the discharge configuration/phase.

14. The process according to claim 8, wherein said part of the working fluid operating according to the closed thermodynamic cycle is between 0% and 50% of said working fluid; wherein the remaining part of the working fluid accumulated in the tank or in the casing is between 100% and 50% of said working fluid.

15. The process according to claim 8, wherein said working fluid has the following physical-chemical properties: critical temperature between 0° C. and 200° C., density at 25° C. between 0.5 kg/m³ and 10 kg/m³.

16. The process according to claim 10, wherein an expansion of the working fluid in the turbine is inter-heated.

17. The process according to claim 10, comprising: increasing the pressure in the discharge phase by means of a pump placed between the secondary heat exchanger and the primary heat exchanger.

18. The process according to claim 8, wherein the working fluid is chosen in the group including: $CO_2$, $SF_6$, $N_2O$; wherein the closed thermodynamic cycle is carried out simultaneously with the charge phase or the discharge phase.

19. An energy generation and storage plant, comprising:
a working fluid other than atmospheric air;
a casing configured to store the working fluid in a gaseous phase and in equilibrium of pressure with the atmosphere;
a tank configured to store said working fluid in liquid or supercritical phase with a temperature close to the critical temperature;
wherein said critical temperature is close to the ambient temperature;
wherein the plant is configured to perform a closed cyclic thermodynamic transformation, first in one direction in a charge configuration and then in an opposite direction in a discharge configuration, between said casing and said tank;
wherein in the charge configuration the plant stores heat and pressure and in the discharge configuration the plant generates energy;
wherein the plant is further configured to define a closed circuit and to perform a closed thermodynamic cycle in said closed circuit with at least part of said working fluid;
wherein the plant further comprises:
  a compressor and a motor mechanically connected to each other;
  a turbine and a generator or a driven machine mechanically connected to each other;
  said casing externally in contact with the atmosphere and delimiting, at the interior thereof, a volume configured to contain the working fluid at atmospheric pressure or substantially atmospheric pressure, wherein said volume is selectively in fluid communication with an inlet of the compressor or with an outlet of the turbine;
  a primary heat exchanger selectively in fluid communication with an outlet of the compressor or with an inlet of the turbine;
  said tank in fluid communication with the primary heat exchanger to accumulate the working fluid;
  a secondary heat exchanger operationally active between the primary heat exchanger and the tank or in said tank;
  an additional heat exchanger operatively interposed between the casing and the compressor and/or between the casing and the turbine; and
  a further heat exchanger operatively interposed between the turbine and the primary heat exchanger;
wherein, in the charge configuration, the casing is in fluid communication with the inlet of the compressor and the primary heat exchanger is in fluid communication with the outlet of the compressor, the turbine is at rest, the motor is operating and drives the compressor to compress the working fluid coming from the casing, the primary heat exchanger works as a cooler to remove heat from the compressed working fluid, cool it and store thermal energy, the secondary heat exchanger works as a cooler to remove further heat from the compressed working fluid and store further thermal energy, the tank receives and stores the compressed and cooled working fluid, wherein the working fluid stored in the tank has a temperature close to its own critical temperature;
wherein, in the discharge configuration, the casing is in fluid communication with the outlet of the turbine and the primary heat exchanger is in fluid communication with the inlet of the turbine, the compressor is at rest, the secondary heat exchanger works as a heater to release heat to the working fluid coming from the tank, the primary heat exchanger works as a heater to release further heat to the working fluid and heat it, the turbine is rotated by the heated working fluid and drives the generator and/or the driven machine, generating energy, the working fluid returns in the casing to atmospheric or substantially atmospheric pressure;
wherein, in said closed circuit, the outlet of the compressor is in fluid communication with the further heat exchanger, the outlet of the turbine is in fluid communication with the inlet of the compressor, and said additional heat exchanger is operatively interposed between the outlet of the turbine and the inlet of the compressor; and
wherein the plant further comprises a recuperator operatively active between the primary heat exchanger and the further heat exchanger and between the outlet of the turbine and the additional heat exchanger.

20. An energy generation and storage plant, comprising:
a working fluid other than atmospheric air;
a casing configured to store the working fluid in a gaseous phase and in equilibrium of pressure with the atmosphere;
a tank configured to store said working fluid in liquid or supercritical phase with a temperature close to the critical temperature;
wherein said critical temperature is close to the ambient temperature;
wherein the plant is configured to perform a closed cyclic thermodynamic transformation, first in one direction in a charge configuration and then in an opposite direction in a discharge configuration, between said casing and said tank;
wherein in the charge configuration the plant stores heat and pressure and in the discharge configuration the plant generates energy;
wherein the plant is further configured to define a closed circuit and to perform a closed thermodynamic cycle in said closed circuit with at least part of said working fluid;
wherein the plant further comprises:
  a compressor and a motor mechanically connected to each other;
  a turbine and a generator or a driven machine mechanically connected to each other;
  said casing externally in contact with the atmosphere and delimiting, at the interior thereof, a volume configured to contain the working fluid at atmospheric pressure or substantially atmospheric pressure, wherein said volume is selectively in fluid communication with an inlet of the compressor or with an outlet of the turbine;
  a primary heat exchanger selectively in fluid communication with an outlet of the compressor or with an inlet of the turbine;
  said tank in fluid communication with the primary heat exchanger to accumulate the working fluid;
  a secondary heat exchanger operationally active between the primary heat exchanger and the tank or in said tank;
  an additional heat exchanger operatively interposed between the casing and the compressor and/or between the casing and the turbine; and
  a further heat exchanger operatively interposed between the turbine and the primary heat exchanger;
wherein, in the charge configuration, the casing is in fluid communication with the inlet of the compressor and the primary heat exchanger is in fluid communication with the outlet of the compressor, the turbine is at rest, the motor is operating and drives the compressor to compress the working fluid coming from the casing, the primary heat exchanger works as a cooler to remove heat from the compressed working fluid, cool it and store thermal energy, the secondary heat exchanger works as a cooler to remove further heat from the compressed working fluid and store further thermal energy, the tank receives and stores the compressed and cooled working fluid, wherein the working fluid stored in the tank has a temperature close to its own critical temperature;

wherein, in the discharge configuration, the casing is in fluid communication with the outlet of the turbine and the primary heat exchanger is in fluid communication with the inlet of the turbine, the compressor is at rest, the secondary heat exchanger works as a heater to release heat to the working fluid coming from the tank, the primary heat exchanger works as a heater to release further heat to the working fluid and heat it, the turbine is rotated by the heated working fluid and drives the generator and/or the driven machine, generating energy, the working fluid returns in the casing to atmospheric or substantially atmospheric pressure;

wherein, in said closed circuit, the outlet of the compressor is in fluid communication with the further heat exchanger, the outlet of the turbine is in fluid communication with the inlet of the compressor, and said additional heat exchanger is operatively interposed between the outlet of the turbine and the inlet of the compressor; and wherein a pump is placed between the secondary heat exchanger and the primary heat exchanger and is configured for increasing the pressure in the discharge configuration.

* * * * *